United States Patent
Sugihara et al.

(10) Patent No.: US 9,556,732 B2
(45) Date of Patent: Jan. 31, 2017

(54) MANAGEMENT SYSTEM AND MANAGEMENT METHOD OF MINING MACHINE

(71) Applicant: Komatsu Ltd., Tokyo (JP)

(72) Inventors: Motohide Sugihara, Fujisawa (JP); Koutarou Hori, Sagamihara (JP)

(73) Assignee: Komatsu Ltd., Tokyo (JP)

( * ) Notice: Subject to any disclaimer, the term of this patent is extended or adjusted under 35 U.S.C. 154(b) by 191 days.

(21) Appl. No.: 14/350,870

(22) PCT Filed: Aug. 30, 2013

(86) PCT No.: PCT/JP2013/073381
§ 371 (c)(1),
(2) Date: Apr. 10, 2014

(87) PCT Pub. No.: WO2015/029228
PCT Pub. Date: Mar. 5, 2015

(65) Prior Publication Data
US 2015/0167461 A1 Jun. 18, 2015

(51) Int. Cl.
| | | |
|---|---|---|
| *G07C 5/08* | (2006.01) | |
| *E21C 35/00* | (2006.01) | |
| *G06Q 50/02* | (2012.01) | |
| *G06Q 10/00* | (2012.01) | |

(52) U.S. Cl.
CPC .......... *E21C 35/00* (2013.01); *G06Q 10/20* (2013.01); *G06Q 50/02* (2013.01); *G07C 5/08* (2013.01)

(58) Field of Classification Search
CPC ..................................................... G07C 5/08
See application file for complete search history.

(56) References Cited

U.S. PATENT DOCUMENTS

| | | | | |
|---|---|---|---|---|
| 5,920,321 A | * | 7/1999 | Owen | .............. G01C 23/00 345/427 |
| 6,484,078 B1 | | 11/2002 | Kageyama | |
| 8,676,442 B2 | * | 3/2014 | Lynar | .............. G08G 1/0112 701/41 |

(Continued)

FOREIGN PATENT DOCUMENTS

| | | |
|---|---|---|
| CA | 2815238 A1 | 5/2013 |
| CN | 103210414 A | 7/2013 |

(Continued)

OTHER PUBLICATIONS

International Search Report dated Nov. 5, 2013, issued for PCT/JP2013/073381.

(Continued)

*Primary Examiner* — Yonel Beaulieu
*Assistant Examiner* — Thomas Ingram
(74) *Attorney, Agent, or Firm* — Locke Lord LLP

(57) ABSTRACT

A mining machine management system includes: a position information detector which is mounted on a mining machine enabled to travel on a route in a mine and detects position information about the mining machine; an operation information detector which is mounted on the mining machine and detects operation information about the mining machine; and a processor which obtains accumulated data of the operation information in a predetermined section of the route based on the position information and the operation information.

12 Claims, 11 Drawing Sheets

(56) References Cited

U.S. PATENT DOCUMENTS

| | | | | |
|---|---|---|---|---|
| 2013/0218373 A1* | 8/2013 | Hedrick | ................ | B60K 37/02 |
| | | | | 701/14 |
| 2014/0244098 A1* | 8/2014 | Ueda | ..................... | G06Q 50/02 |
| | | | | 701/29.3 |
| 2014/0371979 A1* | 12/2014 | Drew | .................. | A01B 79/005 |
| | | | | 701/32.3 |

FOREIGN PATENT DOCUMENTS

| | | | |
|---|---|---|---|
| JP | 2002-334396 A | | 11/2002 |
| JP | 2009-217554 A | | 9/2009 |
| JP | 2013-105278 A | | 5/2013 |
| JP | 2013105278 A | * | 5/2013 |
| WO | WO-2013/100925 A1 | | 7/2013 |

OTHER PUBLICATIONS

Office Action dated Nov. 9, 2015, issued for the corresponding Canadian patent application No. 2,848,835.
Office Action dated Oct. 2, 2015, issued for the Australian Patent Application No. 2013395454.

\* cited by examiner

| OPERATION INFORMATION (SYMBOLS) | OPERATION INFORMATION (TYPES) | OCCURRENCE FREQUENCY (ACCUMULATION DEGREE) | |
|---|---|---|---|
| AAA | XX | 3.3 | ////////////////////// |
| BBB | YY | 2.2 | /////////////// |
| CCC | ZZ | 1.1 | ////////// |

| MODEL NAME | SERIAL NUMBER | TOTAL NUMBER | |
|---|---|---|---|
| HD1 | 1001 | 3 | ///////////// |
| HD2 | 1002 | 2 | ////////// |
| HD3 | 1003 | 1 | /// |

| MODEL NAME | SERIAL NUMBER | TIME | OPERATION INFORMATION (TYPES) |
|---|---|---|---|
| HD1 | 1001 | 20130725:09:45 | XX |
| — | — | — | — |
| — | — | — | — |

MANAGEMENT SYSTEM AND MANAGEMENT METHOD OF MINING MACHINE

FIELD

The present invention relates to a management system and a management method of a mining machine.

BACKGROUND

In mining sites in a mine, mining machines such as a hydraulic excavator and a dump track operate. In these years, information about a mining machine is acquired via wireless communications. Patent Literature 1 discloses a technique in which a traveling state of a mobile unit is acquired using a GPS (Global Positioning System).

CITATION LIST

Patent Literature

Patent Literature 1: Japanese Laid-open Patent Publication No. 2009-217554

SUMMARY

Technical Problem

In these years, a user demand is increasing that preventive maintenance is performed on mining machines and the guidance of driving mining machines is performed in consideration of fuel consumption and productivity. For the purpose of preventive maintenance, it is necessary to suppress inappropriate manipulations and drives, which possibly damage the components of the mining machine. To this end, it is necessary to monitor what manipulation and drive are performed at which position on a traveling route and what vehicle abnormality state occurs. Moreover, in order to guide driving in consideration of fuel consumption and productivity, it is necessary to monitor what manipulation and drive are performed at which position on a traveling route, which possibly impair fuel consumption and productivity, and what vehicle state occurs. Therefore, it is desired to appropriately and easily grasp what problem occurs at which position on the route of the mining machine.

An object of the present invention is to provide a management system and a management method of a mining machine that can easily grasp an inappropriate drive and a vehicle abnormality state that occur on a route in a mine, the content of the vehicle state, for example, and the occurrence position at a glance.

Solution to Problem

According to the present invention, a mining machine management system comprises: a position information detector which is mounted on a mining machine enabled to travel on a route in a mine and detects position information about the mining machine; an operation information detector which is mounted on the mining machine and detects operation information about the mining machine; and a processor which obtains accumulated data of the operation information in a predetermined section of the route based on the position information and the operation information.

The operation information can include an abnormality of the mining machine.

The mining machine management system can further comprise an output device which outputs the accumulated data together with the route in an image in association with the predetermined section of the route.

The image can be outputted to an inside of a mesh in a grid.

The output device can output images in different designs based on an accumulation degree of the accumulated data.

The operation information can include first operation information and second operation information; and the output device can output images in different designs between accumulated data of the first operation information and accumulated data of the second operation information.

The design can include at least one of a color, shape, and size.

The mining machine management system can comprise an evaluation device which evaluates an operation state of the mining machine in the predetermined section based on the accumulated data.

According to the present invention, a management method of a mining machine comprise: detecting position information about a mining machine on a route, the mining machine being enabled to travel on the route in a mine; detecting operation information on the route of the mining machine; and obtaining accumulated data of a plurality of items of the operation information in a predetermined section of the route based on the position information and the operation information.

The accumulated data can be outputted together with the route in an image in association with the predetermined section of the route.

An operation state of the mining machine in the predetermined section can be evaluated based on the accumulated data.

According to the present invention, it is possible to easily grasp an inappropriate drive and a vehicle abnormality state that occur on the route in the mine, the content of the vehicle state, for example, and the occurrence position at a glance.

BRIEF DESCRIPTION OF DRAWINGS

FIG. 10 is a diagram of an exemplary display screen according to the embodiment.

FIG. 11 is a diagram of an exemplary display screen according to the embodiment.

FIG. 12 is a diagram of an exemplary display screen according to the embodiment.

DESCRIPTION OF EMBODIMENTS

In the following, an embodiment of the present invention will be described with reference to the drawings. However, the present invention is not limited thereto.

<The Outline of a Mining Machine Management System>

Figure 1:
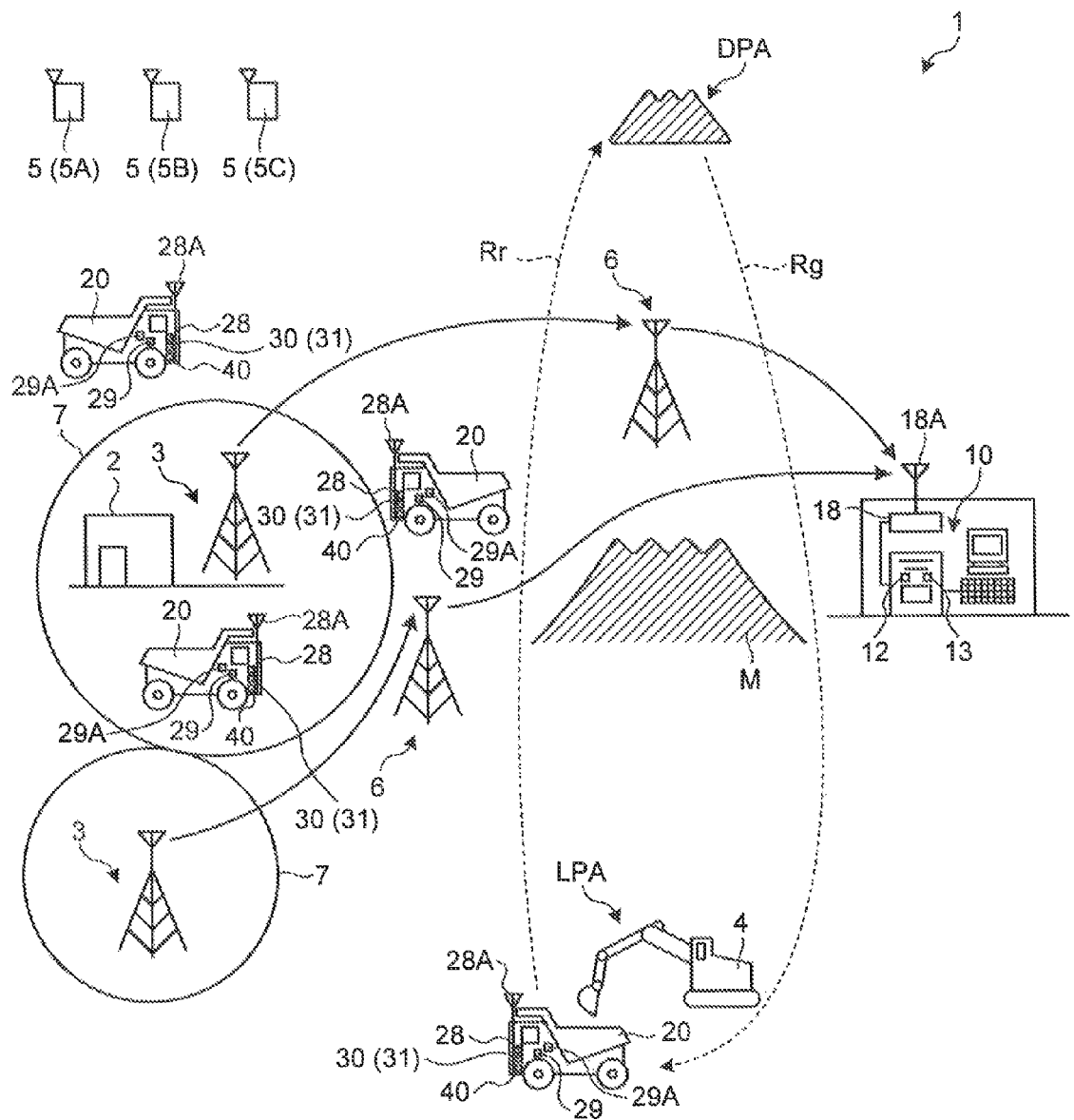
FIG. 1 is a diagram of an exemplary a mining machine management system according to an embodiment.

FIG. 1 is a diagram of a site to which a mining machine management system according to an embodiment is applied. A management system 1 for a mining machine manages the operations of mining machines or evaluates the productivity or the manipulation technique, for example, of the operator of the mining machine, and performs preventive maintenance and abnormality diagnosis, for example, of dump tracks. To this end, the management system 1 identifies a route on which a dump track 20 has traveled, and stores the route as route information. In the following, it is defined that the traveling route includes the route on which the dump track 20 has traveled and places to stop. In the following, the traveling route is appropriately referred to as a route.

The mining machine is a generic term of machines for use in various work operations in a mine. In the embodiment, for one kind of trucks of the mining machines, the dump track 20 is taken as an example, which carries crushed stones or dirt or rocks produced in mining crushed stones, for example, as a load. However, the mining machine according to the embodiment is not limited to the dump track. For example, the mining machine according to the embodiment may be a digging machine that mines crushed stones, for example, and a hydraulic excavator, electric shovel, or wheel loader functioning as a loader that loads a load on the dump track 20. In the embodiment, the dump track 20 is a manned mining machine that travels and unloads a load by the manipulation by an operator. However, the dump track 20 is not limited to such a vehicle. For example, the dump track 20 may be an unattended dump track whose operation is managed by the management system 1.

In the mine, the dump track 20 is loaded with rocks or dirt, for example, by a loader 4 such as a hydraulic excavator at a place (in the following, a loading site) LPA at which a loading operation is performed. The dump track 20 then unloads the loaded rocks or dirt, for example, at a place (in the following, an unloading site) DPA at which the load is unloaded. The dump track 20 moves between the loading site LPA and the unloading site DPA as traveling on routes Rg and Rr.

<The Outline of a Mining Machine Management System>

In the management system for the mining machine (in the following, appropriately referred to as the management system) 1, a management apparatus 10 collects information about the position of the dump track 20 as a mining machine (in the following, referred to as position information) and information about an operation state (in the following, referred to as operation information) from the dump track 20 via wireless communications. Different from the dump track 20, which is a mobile unit, the management apparatus 10 is disposed on the management facility of the mine, for example. As described above, the management apparatus 10 is not intended for mobile use in principle. The information collected at the management apparatus 10 includes position information about the dump track 20 (the coordinates of the latitude, the longitude, and the altitude) and operation information about the dump track 20. For example, the operation information is at least one of the traveling time, the distance covered, the engine water temperature, the presence or absence of an abnormality, the location of an abnormality, the fuel consumption rate, the loadage (a vehicle live load), and so on. The position information and the operation information are mainly used for creating the traveling route map of the dump track 20, traveling route mapping, drive evaluation, preventive maintenance, and abnormality diagnosis, for example. Therefore, the position information and the operation information are useful for cooping with needs such as the improvement of productivity in the mine or the improvement of operations in the mine. The operation information will be described later in detail.

The management system 1 includes a position information detector 29 that is mounted on the dump track 20 and detects position information about the dump track 20, an operation information detector 40 that is mounted on the dump track 20 and detects operation information about the dump track 20, an on-vehicle processor 30 that is mounted on the dump track 20 and performs various processes related to management, an on-vehicle storage device 31 that is mounted on the dump track 20 and stores various items of information about management, a management side processor 12 that is provided on the management apparatus 10 and performs various processes related to management, and a management side storage device 13 that is provided on the management apparatus 10 and stores various items of information about management.

The on-vehicle processor 30 processes position information and operation information about the dump track 20. The on-vehicle storage device 31 stores position information and operation information about the dump track 20.

The management side processor 12 processes position information and operation information about the dump track 20. The management side storage device 13 stores position information and operation information about the dump track 20.

In the embodiment, the management system 1 makes reference to position information about a route (a registered route) registered (stored) on one or both of the management side storage device 13 and the on-vehicle storage device 31 (in the following, referred to as route information), and identifies the actual traveling route by determining whether to match position information about a route on which the dump track 20 has actually traveled (an actual traveling route) derived from the result detected at the position information detector 29 with the registered route.

In the embodiment, the management system 1 acquires operation information about the dump track 20 derived from the result detected at the operation information detector 40 in association with position information about the dump track 20 detected at the position information detector 29. The management system 1 finds the accumulated data of a plurality of items of operation information in a predetermined section of the route on which the dump track 20 has traveled based on the acquired position information and the operation information about the dump track 20. The management system 1 evaluates the operation state of the dump track 20 in a predetermined section of the route based on the found accumulated data. Moreover, the management system 1 stores the found accumulated data on one or both of the management side storage device 13 and the on-vehicle storage device 31.

The operation information about the dump track 20 includes at least one of information about the vehicle and information about the operation status.

For example, the vehicle information about the dump track 20 includes information about the vehicle state and information about an abnormality. For example, the information about the operation status of the dump track 20 includes information about operation hours, information about traveling, information about drive manipulation by the operator, and information about a load carried.

For example, the information about the vehicle state of the dump track 20 includes information about the amount of fuel consumed per unit time, information about the engine, information about the drive system, information about the manipulation system, information about events, information about the engine speed (the rotation speed) of the engine, information about the temperature of the cooling fluid of the engine, information about the transmission state, and information about the engine speed (the rotation speed) of the drive shaft.

For example, the information about an abnormality of the dump track 20 includes information about the presence or absence of an abnormality, information about the location of an abnormality, information about the content of the abnormality, information about a failure, and information about vehicle errors.

For example, the information about operation hours of the dump track 20 includes information about the operation start time and information about the operation finish time.

For example, the information about traveling of the dump track 20 includes information about whether the dump track 20 is traveling, information about the traveling speed, information about the distance covered, information about acceleration (deceleration) in traveling, information about the traveling time, information about the down time (stoppage time), information about the acceleration frequency, the information about the deceleration frequency, the information about the stop frequency (the stoppage frequency), information about the traveling time by inertia, and information about the distance covered by inertia.

For example, the information about the drive manipulation of the dump track 20 includes information about abnormal drives (abnormal manipulations), information about manipulation history, and information about events. For example, the information about abnormal drives (abnormal manipulations) of the dump track 20 includes information about the presence or absence of an abnormal manipulation by the operator and information about the content of the abnormal manipulation.

For example, the information about a load carried on the dump track 20 includes information about the presence or absence of a load, information about a transport load (a loadage), information about the loading operation, and information about the unloading operation. The information about the loading operation includes information about whether to start the loading operation, information about whether the loading operation is being performed, information about whether to finish the loading operation, and information about the loading operation time, for example. The information about the unloading operation includes information about whether to start the unloading operation, information about whether the unloading operation is being performed, information about whether to finish the unloading operation, and information about the unloading operation time, for example.

It is noted that the operation information about the dump track 20 may include information about the route on which the dump track 20 travels. For example, the operation information about the dump track 20 may include information about jams, information about the gradient of the route, information about the orientation of the route, and information about the route state. For example, the information about jams includes information about the presence or absence of a jam and information about a degree of the jam. For example, the information about the gradient of the route includes information about the presence or absence of a gradient and information about the tilt angle of the route. For example, the information about the orientation of the route includes information about the presence or absence of a curve (a corner) on the route and information about the angle of the curve (the corner) on the route. For example, the information about the route state includes information about whether the route is dry or wet, information about the degree how the route is dry, information about the degree how the route is wet, and information about the presence or absence of an obstacle.

For example, the operation information about the dump track 20 is used for the evaluation of the productivity of the dump track 20, the evaluation of the driving technique of the operator of the dump track 20, the maintenance of the dump track 20, and the abnormality diagnosis of the dump track 20.

The operation information detector 40 includes a plurality of sensors that can detect operation information about the dump track 20. The operation information about the dump track 20 detected at the operation information detector 40 is sent to the management apparatus 10 through an on-vehicle wireless communication device 28 and a management side wireless communication device 18.

The management apparatus 10 is connected to the management side wireless communication device 18 including an antenna 18A to collect position information and operation information about the dump track 20 operating in the mine. The dump track 20 includes the on-vehicle wireless communication device 28 and an antenna 28A to send position information and operation information or to mutually communicate with the management apparatus 10. The on-vehicle wireless communication device will be described later. In addition to this, the dump track 20 receives radio waves from a plurality of GPS (Global Positioning System) satellites 5 (5A, 5B, and 5C) at a GPS antenna 29A, and can position the location of the dump track 20 using the position information detector 29. It is noted that in order to position the location of the dump track 20 itself, other positioning satellites may be used, not limited to the GPS satellites. Namely, it is sufficient that the GNSS (Global Navigation Satellite System) is used to position the location.

The output of radio waves sent from the dump track 20 through the antenna 28A is not in the communication range that can cover the entire mine. Moreover, it is not enabled that the radio waves sent from the antenna 28A are sent over a distance beyond an obstacle M such as a high mountain because of wavelengths. Of course, when a wireless communication device that can output high-output radio waves is used, it is possible that such communication failures are eliminated, the communication feasible range is spread, and communication infeasible places are eliminated. However, since the mine is far and wide, it is necessary to cope with the situation as in which it is necessary to suppress the costs of repeaters and communication devices and the situation as in which it is unexpected to secure well-equipped communication infrastructures depending on regions where mines are located. Therefore, the management system 1 uses a wireless system that can form an information communication network in a limited range such as a wireless LAN (Local Area Network). Although it is possible to establish mutual communications between the mining machine and the management facility (the management apparatus 10) at low costs via a wireless LAN, for example, it is necessary to solve problems of communication failures.

A limitation is imposed on the coverage of the radio waves sent from the dump track 20 through the antenna 28A. Therefore, when the dump track 20 is apart from the management apparatus 10, or when an obstacle such as a mountain M exists between the dump track 20 and the management apparatus 10, it is difficult for the management side wireless communication device 18 to receive radio waves sent from the dump track 20. Thus, the management system 1 includes a repeater 3 that relays radio waves sent from the antenna 28A of the dump track 20 and sends the radio waves to the management side wireless communication device 18. The repeater 3 is disposed at a plurality of predetermined places in the mine, so that the management apparatus 10 can collect position information and operation information from the dump track 20 operated at a location far from the management apparatus 10 via wireless communications.

In the case where the repeater 3 is apart from the management side wireless communication device 18, an intermediate repeater 6 is disposed between the repeater 3 and the management side wireless communication device 18 to relay the repeater 3 to the management side wireless communication device 18. In the embodiment, the intermediate repeater 6 only relays the repeater 3 to the management side wireless communication device 18, and does not relay the radio waves sent from the antenna 28A of the dump track 20. In the embodiment, the intermediate repeater 6 relays radio waves only from the corresponding repeater 3. For example, as illustrated in FIG. 1, only a single intermediate repeater 6 relays radio waves from the repeater 3 at a service station 2. It is noted that in FIG. 1, the intermediate repeater 6 is expressed as in the one-to-one relationship with a single repeater 3. However, the relationship is not limited to the one-to-one relationship, and the intermediate repeaters 6 can relay radio waves sent from a plurality of the repeaters 3.

A predetermined region around the place at which the repeater 3 is disposed (a region in a circle in FIG. 1) is a range in which the on-vehicle wireless communication device 28 mounted on the dump track 20 can mutually communicate with the repeater 3 via wireless communications, that is, a communication feasible range 7. The dump track 20 in the communication feasible range 7 can mutually communicate with the management side wireless communication device 18 via wireless communications through the repeater 3, for example.

<The Management Apparatus>

Figure 2:
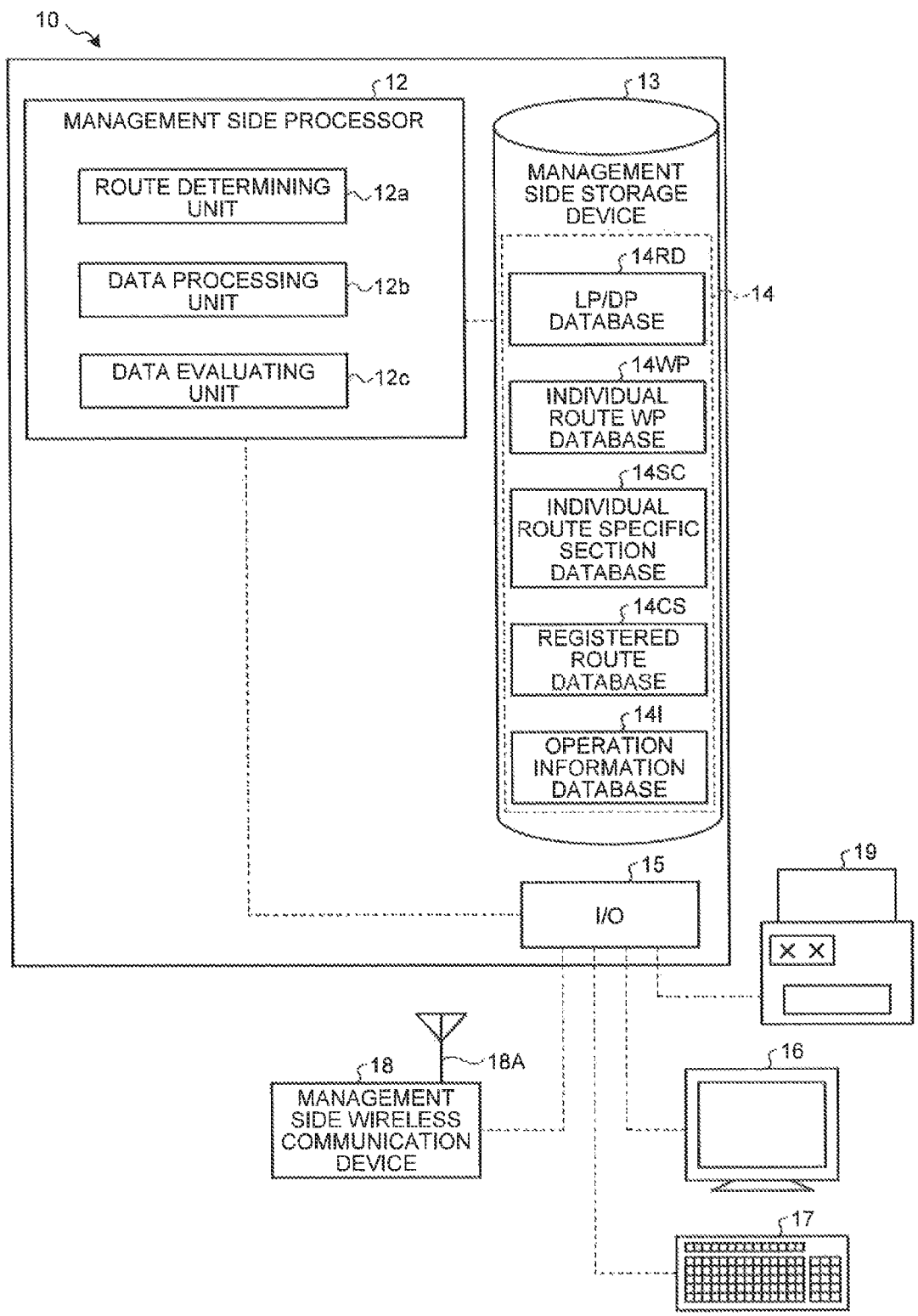
FIG. 2 is a diagram of an exemplary management apparatus according to the embodiment.

Next, the management apparatus 10 will be described. FIG. 2 is a functional block diagram of an exemplary management apparatus 10 according to the embodiment. The management apparatus 10 includes the management side processor 12, the management side storage device 13, and an input/output unit (I/O) 15. Moreover, in the management apparatus 10, a display device 16, an input device 17, the management side wireless communication device 18, and a printing device 19 are connected to the input/output unit 15.

The management apparatus 10 is a computer, for example. The management side processor 12 is a CPU (Central Processing Unit), for example. For example, the management side storage device 13 is a RAM (Random Access Memory), a ROM (Read Only Memory), a flash memory, or a hard disk drive, or a combination of them. The input/output unit 15 is used for input and output (an interface) of information between the management side processor 12 and the display device 16, the input device 17, the management side wireless communication device 18, and the printing device 19 externally connected to the management side processor 12.

The management side processor 12 performs a management method of a mining machine according to the embodiment. The management side processor 12 includes a route determining unit 12a, a data processing unit 12b, and a data evaluating unit 12c. The route determining unit 12a as a determining unit identifies the route on which the dump track 20 has actually traveled in the mine by determining whether the route is matched with the already existing traveling route. The already existing traveling route is a route on which the dump track 20 has traveled in the past or a preset route. The data processing unit 12b processes position information and operation information about the dump track 20, and finds the accumulated data of a plurality of items of operation information about the dump track 20 that has traveled on the route. The data evaluating unit 12c evaluates the operation state of the dump track 20 on the route on which the dump track 20 has traveled based on the accumulated data found at the data processing unit 12b. These functions are implemented in which the management side processor 12 reads the corresponding computer programs out of the management side storage device 13 and executes the programs.

The management side storage device 13 stores various computer programs to cause the management side processor 12 to execute various processes. In the embodiment, for example, the computer programs stored on the management side storage device 13 includes a route identification computer program that implements the management method of a mining machine according to the embodiment and identifies the route on which the dump track 20 has traveled, an operation information collecting computer program that collects position information and operation information about the dump track 20, for example, and computer programs that perform various evaluations based on the operation information, for example.

The management side storage device 13 stores a database 14 on which various items of information about management are described. The database 14 includes an LP/DP database 14RD, an individual route WP database 14WP, an individual route specific section database 14SC, a registered route database 14CS, and an operation information database 141. The LP/DP database 14RD is described with position information about a loading site LPA and an unloading site DPA of the dump track 20. The individual route WP database 14WP is described with position information about a passage position WP on the route on which the dump track 20 has traveled or is to travel. The individual route specific section database 14SC is described with position information about a specific section that is a portion including the same characteristics (the gradient, the orientation of the route, for example) on the route on which the dump track 20 has traveled or is to travel. The registered route database 14CS is described with information including position information about a preset route (a registered route) as a route on which the dump track 20 operating in the mine has traveled or a route on which the dump track 20 operating in the mine has to travel. In the embodiment, the operation information database 141 is described with operation information collected from the dump track 20 and the accumulated data. The individual route WP database 14WP and the individual route specific section database 14SC include aggregated data including the coordinates of the latitude, the longitude, and the altitude of position information.

For example, the display device 16 is a flat panel display such as a liquid crystal display, and displays information necessary for collecting and evaluating position information or operation information about the dump track 20. For example, the input device 17 is a keyboard, a touch panel, or a mouse, and inputs information necessary in collecting position information or operation information about the dump track 20. The management side wireless communication device 18 includes the antenna 18A, and performs mutual wireless communications with the on-vehicle wireless communication device 28 of the dump track 20 through the repeater 3. For example, the printing device 19 is a printing device (a printer), and prints and outputs a report generated in the management apparatus 10, diagrams for evaluating operation information, for example. The printing device 19 may output sounds according to the content of a report described later. The display device 16 and the printing device 19 are one kind of output devices that output various items of information.

<The Dump Track>

Figure 3:
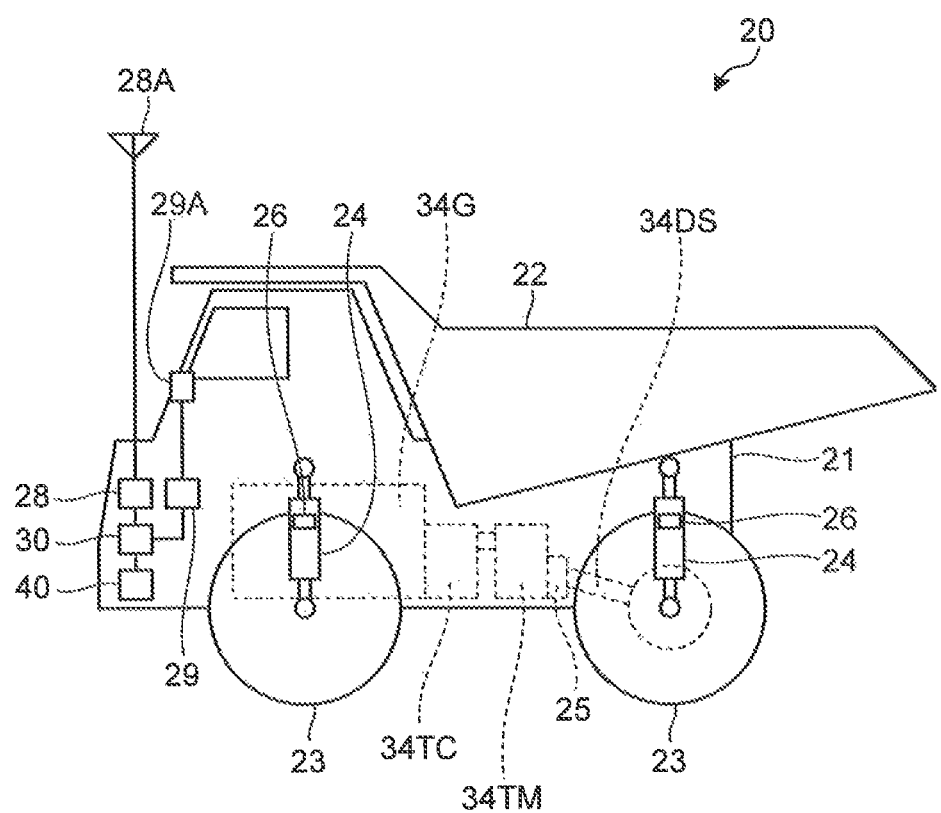
FIG. 3 is a diagram of an exemplary dump track according to the embodiment.

Next, the dump track 20 will be described more in detail. FIG. 3 is a diagram of an exemplary configuration of the dump track 20. The dump track 20 loads a load and travels, and unloads the load at a desired place. The dump track 20 includes a vehicle main body 21, a vessel 22, a wheel 23, a suspension cylinder 24, a rotation sensor 25, a suspension pressure sensor (in the following, referred to as a pressure sensor) 26, the on-vehicle wireless communication device 28 to which the antenna 28A is connected, the position information detector (the GPS receiver, in the embodiment) 29 to which the GPS antenna 29A is connected, the on-vehicle processor 30, and the operation information detector 40 including a plurality of sensors. It is noted that the dump track 20 includes various mechanisms and functions included in a typical track, other than the configurations described above. It is noted that in the embodiment, a rigid dump track 20 is taken as an example. However, the dump track 20 may be an articulated dump track in which the car body is split into a front part and a rear part and the front part is joined to the rear part using a free joint.

In the dump track 20, an internal combustion engine such as a diesel engine (in the following, appropriately referred to as an engine 34G) drives a drive shaft 34DS through a torque converter 34TC and a transmission 34TM for driving the wheel 23. As described above, the dump track 20 is in a so-called machine drive mode. However, the drive mode of the dump track 20 is not limited thereto, which may be a so-called electric drive mode. The vessel 22 functions as a carriage on which a load is loaded, and elevatably disposed on the upper part of the vehicle main body 21. On the vessel 22, quarried crushed stones, rocks, or dirt, for example, are loaded using the loader 4 such as a hydraulic excavator.

The wheel 23 includes tires and wheels, and rotatably mounted on the vehicle main body 21. The wheel 23 is driven by transmitting power from the vehicle main body 21 through the drive shaft 34DS as described above. The suspension cylinder 24 is disposed between the wheel 23 and the vehicle main body 21. A load according to the masses of the vehicle main body 21 and the vessel 22 and the mass of a load when the load is loaded acts on the wheel 23 through the suspension cylinder 24.

The rotation sensor 25 detects the rotation speed of the drive shaft 34DS to measure the vehicle speed. A hydraulic oil is sealed in the inside of the suspension cylinder 24, and the suspension cylinder 24 extends and contracts according to the weight of a load. It is noted that the suspension pressure sensor (also referred to as a pressure sensor as necessary) 26 detects a load acting on the suspension cylinder 24. The pressure sensor 26 is individually disposed on the suspension cylinders 24 of the dump track 20, in which the pressure of the hydraulic oil is detected to detect the presence or absence of a load and to measure the mass (the loadage) of a load.

The GPS antenna 29A receives radio waves outputted from a plurality of the GPS satellites 5A, 5B, and 5C forming the GPS (Global Positioning System) (see FIG. 1). The GPS antenna 29A outputs the received radio waves to the position information detector 29. The position information detector 29 as a position information detecting unit converts the radio waves received at the GPS antenna 29A into electrical signals, and calculates (positions) position information about the position information detector 29, that is, the position of the dump track 20 for finding position information about the dump track 20. The position information is information about the position of the dump track 20, and is the coordinates of the latitude, the longitude, and the altitude. A plurality of items of position information, which a plurality of items of position information acquired at the position information detector 29 based on a lapse of time is arranged in a time series, is the route on which the dump track 20 has traveled.

The on-vehicle wireless communication device 28 mutually communicates with the repeater 3 or the antenna 18A on the management facility illustrated in FIG. 1 through the antenna 28A via wireless communications. The on-vehicle wireless communication device 28 is connected to the on-vehicle processor 30. With this structure, the on-vehicle processor 30 sends and receives items of information through the antenna 28A.

<The on-Vehicle Processor, the on-Vehicle Storage Device, the Position Information Detector, and the Operation Information Detector>

Figure 4:
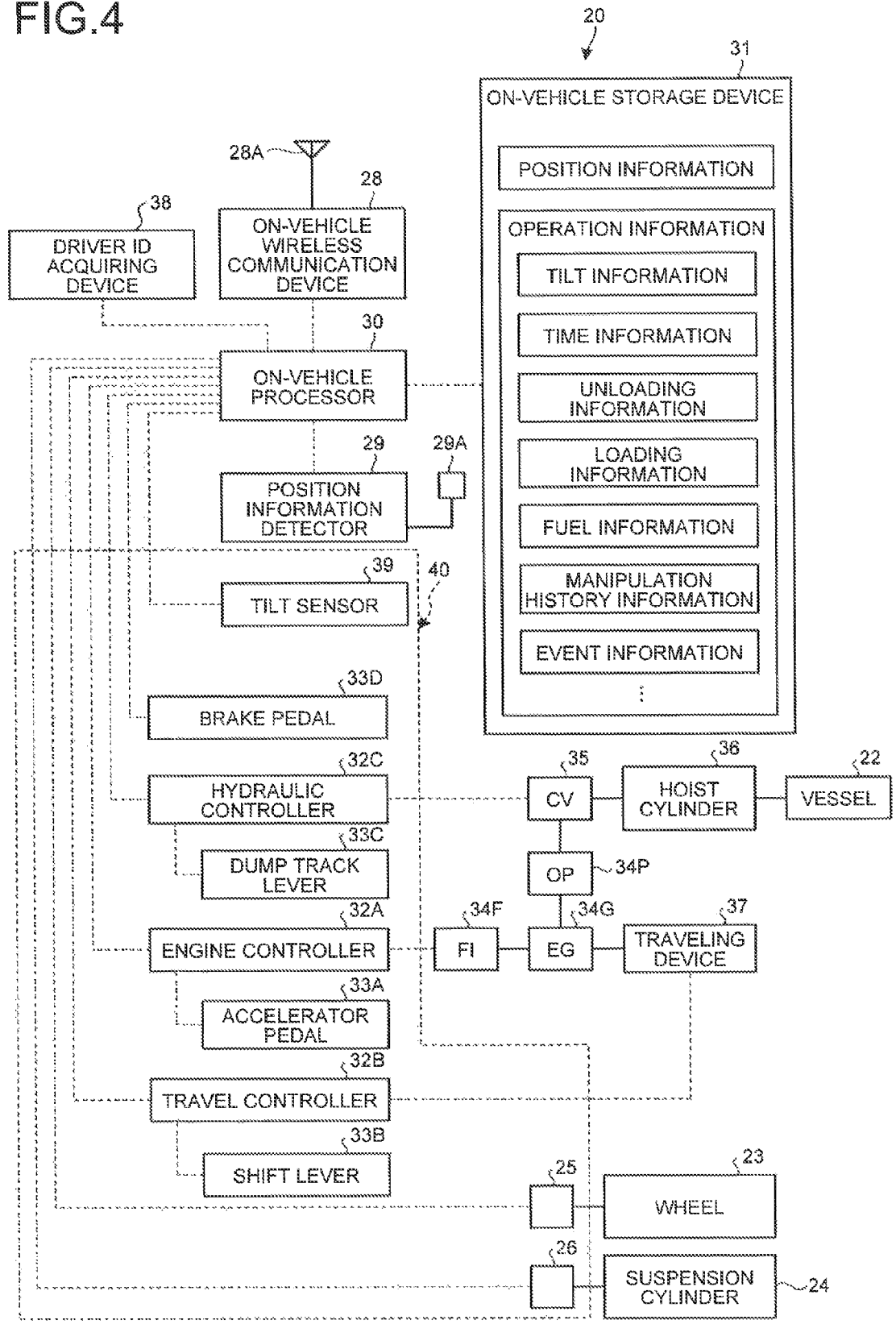
FIG. 4 is a diagram of an exemplary on-vehicle processor, on-vehicle storage device, position information detector, and operation information detector according to the embodiment.

Next, the on-vehicle processor 30, the on-vehicle storage device 31, the position information detector 29, and the operation information detector 40 will be described. FIG. 4 is a functional block diagram of examples of the on-vehicle processor 30 and peripheral devices according to the embodiment.

As illustrated in FIG. 4, the dump track 20 includes the on-vehicle processor 30, the on-vehicle storage device 31, the on-vehicle wireless communication device 28, the position information detector 29, a driver ID acquiring device 38, and the operation information detector 40. The on-vehicle storage device 31, the on-vehicle wireless communication device 28, the position information detector 29, the driver ID acquiring device 38, and the operation information detector 40 are connected to the on-vehicle processor 30. For example, the on-vehicle processor 30 is a computer that combines a CPU (Central Processing Unit) with a memory. The on-vehicle processor 30 acquires and processes various items of information about the dump track 20.

The driver ID acquiring device 38 is a device that acquires a driver ID to identify the driver of the dump track 20 (in the following, also referred to as an operator). The dump track 20 is sometimes alternately driven by a plurality of drivers. For example, the driver ID can be acquired from individual ID keys of drivers (electronic keys on which personal identification information is stored) or individual ID cards of drivers (cards on which personal identification information is stored). In this case, a magnetic reader or a wireless communication device, for example, is used for the driver ID acquiring device 38. Moreover, it may be possible in which a fingerprint recognition device is provided as the driver ID acquiring device 38 and fingerprint identification is individually performed between the fingerprint of the driver stored in advance and the fingerprint of the driver to acquire a driver ID. Furthermore, the driver ID can also be acquired in which drivers individually input ID information about the drivers using an input device (personal identification information such as a password number) to check the ID information against ID information stored in advance. As described above, the driver ID acquiring device 38 is an ID key reader or an ID card reader, a fingerprint recognition device, or the ID information input device, for example, and the driver ID acquiring device 38 may be provided near the driver seat in the driver's cab of the dump track 20 or provided at a given place on the vehicle main body 21 to which the driver comes close when making access to the driver's cab. It is noted that the driver IDs of drivers boarding on the dump tracks 20 are sometimes sent from the management apparatus 10 to the dump track 20 via wireless communications according to daily production planes of the mine. In this case the on-vehicle wireless communication device 27 also serves as the driver ID acquiring device 38. It is possible to identify which driver drives which dump track 20 using the driver ID acquired at the driver ID acquiring device 38.

For example, the on-vehicle storage device 31 includes a RAM (Random Access Memory), a ROM (Read Only Memory), a flash memory, or a hard disk drive, or a combination of them. The on-vehicle storage device 31 stores a computer program described with instructions to collect position information and operation information about the dump track 20 at the on-vehicle processor 30 and various set values to operate the management system 1 for the mining machine, for example. The on-vehicle processor 30 reads the computer program, acquires position information from the position information detector 29 at a predetermined timing, acquires operation information from the sensors included in the operation information detector 40, and temporarily stores the operation information on the on-vehicle storage device 31. At this time, the on-vehicle processor 30 may perform a statistical process to find the mean value, mode, or standard deviation, for example, on the same item of information.

The on-vehicle storage device 31 stores clinometer information, time information, unloading information, loading information, fuel consumption information, manipulation history information, and event information, for example, as operation information. For example, the event information means vehicle error information, abnormal drive information, and failure information. These items of operation information stored on the on-vehicle storage device 31 are examples, and operation information is not limited thereto. It is noted that the operation information will be described later in detail. The position information, the clinometer information, the unloading information, the loading information, the fuel consumption information, the manipulation history information, and the event information, for example, are stored on the on-vehicle storage device 31 in association with time at which these items of information occur (time at which the on-vehicle processor 30 acquires these items of information). The on-vehicle processor 30 receives an instruction signal expressing a request from the management apparatus 10 illustrated in FIG. 2 through the on-vehicle wireless device 28, and sends position information and operation information stored on the on-vehicle storage device 31 to the management apparatus 10 similarly through the on-vehicle wireless communication device 28.

The position information detector 29 detects position information about the dump track 20. The on-vehicle processor 30 acquires position information about the dump track 20 using the position information detector 29.

The on-vehicle processor 30 finds the route on which the dump track 20 has traveled (the actual traveling route) based on a plurality of items of position information detected at the position information detector 29 and time information at which the position information is detected. A plurality of items of position information arranged in a time series expresses the actual traveling route of the dump track 20.

The operation information detector 40 detects operation information about the dump track 20. The on-vehicle processor 30 acquires operation information about the dump track 20 using the operation information detector 40. The operation information detector 40 includes a plurality of sensors that detects operation information about the dump track 20. For example, the operation information detector 40 includes the rotation sensor 25 that detects the traveling speed of the dump track 20, the pressure sensor 26 that detects the weight of the load carried on the dump track 20, an engine controller 32A, a travel controller 32B, a hydraulic controller 32C, and a tilt sensor 39. In the following, examples of items of operation information that can be acquired based on the signals of these sensors will be described in detail.

The rotation sensor 25 detects the rotation speed of the drive shaft 34DS that drives the wheel 23. The result detected at the rotation sensor 25 is outputted to the on-vehicle processor 30. The on-vehicle processor 30 can derive the traveling speed of the dump track 20 based on the output from the rotation sensor 25. Moreover, the on-vehicle processor 30 can derive the acceleration (deceleration) of the dump track 20 based on the output from the rotation sensor 25. Furthermore, the on-vehicle processor 30 can determine whether the dump track 20 is traveling or stops based on the output from the rotation sensor 25.

In addition, the on-vehicle processor 30 can derive at least one of the distance covered, the traveling time, and the down time (stoppage time) of the dump track 20 based on time information detected at a built-in timer and the output from the rotation sensor 25. Moreover, the on-vehicle processor 30 can derive the number of times (the acceleration frequency) that the dump track 20 accelerates on the route, the number of times (the deceleration frequency) that the dump track 20 decelerates, and the number of times (the stoppage frequency) that the dump track 20 stops (the stoppage operation), based on time information detected at the built-in timer and the output from the rotation sensor 25.

The pressure sensor 26 detects a pressure acting on the hydraulic oil of the suspension cylinder 24. The result detected at the pressure sensor 26 is outputted to the on-vehicle processor 30. The on-vehicle processor 30 can derive the weight (the loadage and the transport load) of a load based on the output values of the pressure sensors 26 individually provided on the suspension cylinders 24 mounted on the four the wheels 23 of the dump track 20. Moreover, since can the weight of the load can be measured, the presence or absence of a load on the vessel 22 can be determined.

The on-vehicle processor 30 can determine whether to start loading a load on the vessel 22, whether a load is being loaded, whether to finish loading a load, whether to start unloading a load out of the vessel 22, whether a load is being unloaded, whether to finish unloading a load, and whether the dump track 20 is traveling, for example, based on time information detected at the built-in timer and the output from the pressure sensor 26. For example, in the case where the value of the output from the pressure sensor 26 is increased and exceeds a predetermined value (a half of a prescribed loadage value of the dump track 20, for example), the on-vehicle processor 30 can determine that a load is being loaded at the loading site LPA. Moreover, in the case where the value of the output from the pressure sensor 26 is reduced and falls below a predetermined value (a quarter of a prescribed loadage value of the dump track 20, for example), the on-vehicle processor 30 can determine that a load is being unloaded at the unloading site DPA. It is noted that the on-vehicle processor 30 may make a determination on the loading operation and the unloading operation based on the output from the pressure sensor 26, the manipulation state of a dump track lever 33C (one or both of the operative position and the manipulated variable), or both, or may make a determination on the unloading operation based only on the manipulation state of the dump track lever 33C (one or both of the operative position and the manipulated variable).

The engine controller 32A outputs the controlled variable of a fuel injector 34F to the on-vehicle processor 30. The on-vehicle processor 30 can derive the fuel injection quantity by acquiring the controlled variable of the fuel injector 34F, and can derive the amount of fuel consumed based on the fuel injection quantity. Furthermore, the on-vehicle processor 30 can derive the amount of fuel consumed per unit distance covered based on the distance covered of the dump track 20 derived using the rotation sensor 25, for example, and the fuel injection quantity. In addition, the on-vehicle processor 30 can derive the distance covered per unit amount of fuel consumed based on the distance covered and the fuel injection quantity. Moreover, the on-vehicle processor 30 can derive the amount of fuel consumed per unit time based on time information detected at the built-in timer and the fuel injection quantity. Furthermore, the on-vehicle processor 30 can derive the transport load per unit time based on time information detected at the built-in timer and the transport load derived using the pressure sensor 26, for example. Furthermore, the on-vehicle processor 30 can derive the transport load per unit amount of fuel consumed based on the transport load and the fuel injection quantity. It is noted that the transport load per unit amount of fuel consumed may be found based on the amount of fuel consumed per unit time and the transport load per unit time.

The engine controller 32A outputs information about the manipulation of an accelerator pedal 33A of the dump track 20 (one or both of the operative position and the manipulated variable) to the on-vehicle processor 30. The on-vehicle processor 30 can determine whether the manipulation of the accelerator pedal 33A by the operator is normal (whether to be abnormal) by acquiring information about the manipulation of the accelerator pedal 33A. The on-vehicle processor 30 can determine the presence or absence of an abnormal manipulation by the operator based on information about the manipulation of the accelerator pedal 33A. Moreover, in the case where it is determined that an abnormal manipulation by the operator is found, the on-vehicle processor 30 can derive (can identify) the content of the abnormal manipulation. In the example, the on-vehicle processor 30 can identify that an abnormality occurs in the manipulation of the accelerator pedal 33A based on information about the manipulation of the accelerator pedal 33A.

The on-vehicle processor 30 can derive the traveling time by inertia and distance covered by inertia of the dump track 20 based on information about the manipulation of the accelerator pedal 33A, time information detected at the built-in timer, and the output from the rotation sensor 25. Traveling by inertia means that in the state in which the dump track 20 travels at a certain speed by operating the accelerator pedal 33A, the dump track 20 travels by inertia (coasting) after the operator releases the operation of the accelerator pedal 33A (after the operator stops pressing down the accelerator pedal 33A). The traveling time of the dump track 20 by inertia means the time for which the dump track 20 travels by inertia (coasting). The distance covered by the dump track 20 by inertia means a distance for which the dump track 20 has traveled by inertia (coasting). Moreover, the on-vehicle processor 30 can derive the speed (the traveling speed) of the dump track 20 at a time point when the dump track 20 starts traveling by inertia based on information about the manipulated variable of the accelerator pedal 33A and the output from the rotation sensor 25.

The engine controller 32A outputs information about at least one of the engine speed (or the rotation speed) of the engine 34G, the temperature of the cooling fluid of the engine 34G, and the pressure of the lubricating oil of the engine 34G to the on-vehicle processor 30. The engine speed of the engine 34G can be detected using the rotation sensor disposed on the output shaft of the engine 34G. The temperature of the cooling fluid of the engine 34G can be detected using the temperature sensor. The pressure of the lubricating oil of the engine 34G can be detected using the pressure sensor. The on-vehicle processor 30 can derive whether the engine speed of the engine 34G is normal (or abnormal) by acquiring information about the engine speed of the engine 34G through the engine controller 32A. The on-vehicle processor 30 can derive whether the temperature of the cooling fluid of the engine 34G is normal (or abnormal) by acquiring information about the temperature of the cooling fluid of the engine 34G through the engine controller 32A. The on-vehicle processor 30 can derive whether the pressure of the lubricating oil of the engine 34G is normal (or abnormal) by acquiring information about the pressure of the lubricating oil of the engine 34G through the engine controller 32A. The on-vehicle processor 30 can derive the presence or absence of an abnormality in the dump track 20 based on information about at least one of the engine speed (or the rotation speed) of the engine 34G, the temperature of the cooling fluid of the engine 34G, and the pressure of the lubricating oil of the engine 34G. In the case where it is determined that an abnormality is found in the dump track 20, the on-vehicle processor 30 can derive (can identify) a location where the abnormality occurs. In the example, the on-vehicle processor 30 can identify that an abnormality occurs in the engine speed of the engine 34G based on the output from the rotation sensor that detects the engine speed of the engine 34G, for example.

The travel controller 32B outputs information from a traveling device 37 to the on-vehicle processor 30. The traveling device 37 can output information about at least one of the transmission state and the engine speed (or the rotation speed) of the drive shaft. The on-vehicle processor 30 can determine whether the transmission state is normal (or abnormal) by acquiring information about the transmission state through the travel controller 32B, and can determine whether the engine speed (or the rotation speed) of the drive shaft is normal (or abnormal) by acquiring information about the engine speed (or the rotation speed) of the drive shaft through the travel controller 32B. The on-vehicle processor 30 can derive (can determine) the presence or absence of an abnormality in the dump track 20 based on information about at least one of the transmission state and the engine speed (or the rotation speed) of the drive shaft. In the case where it is determined that an abnormality is found in the dump track 20, the on-vehicle processor 30 can derive (can identify) a location where the abnormality occurs. In the example, the on-vehicle processor 30 can identify that an abnormality occurs in the engine speed of the drive shaft based on the output from the rotation sensor that detects the engine speed of the drive shaft, for example.

The travel controller 32B outputs information about the manipulation of a shift lever 33B (one or both of the operative position and the manipulated variable of the shift lever 33B) to the on-vehicle processor 30. The operator manipulates the shift lever 33B to instruct the travel controller 32B of a change in at least one of the dump track 20 going forward and backward and the traveling speed. The on-vehicle processor 30 can determine whether the manipulation of the shift lever 33B by the operator (the operative position or the manipulated variable) is normal (or abnormal) by acquiring information about the manipulation of the shift lever 33B (one or both of the operative position and the manipulated variable) through the travel controller 32B. The on-vehicle processor 30 can determine the presence or absence of an abnormal manipulation by the operator based on the manipulation of the shift lever 33B. In the case where it is determined that an abnormal manipulation by the operator is found, the on-vehicle processor 30 can derive (can identify) the content of the abnormal manipulation. In the example, the on-vehicle processor 30 can identify that an abnormality occurs in the manipulation of the shift lever 33B based on the manipulation of the shift lever 33B.

The hydraulic controller 32C can output information about the open and close states of a hydraulic oil the control valve 35 to the on-vehicle processor 30. The hydraulic oil the control valve 35 can supply a hydraulic oil from an oil pump 34P to a hoist cylinder 36 and discharge the hydraulic oil from the hoist cylinder 36. The hoist cylinder 36 can hoist and lower the vessel 22. The on-vehicle processor 30 can determine whether the hoisting and lowering states of the vessel 22 are normal (or abnormal) by acquiring information about the open and close states of the hydraulic oil the control valve 35 through the hydraulic controller 32C. The on-vehicle processor 30 can derive the presence or absence of an abnormality in the dump track 20 based on information about the open and close states of the hydraulic oil the control valve 35. In the case where it is determined that an abnormality is found in the dump track 20, the on-vehicle processor 30 can derive (can identify) a location where the abnormality occurs. In the example, the on-vehicle processor 30 can identify that an abnormality occurs in the vessel 22 based on information about the open and close states of the hydraulic oil the control valve 35.

The hydraulic controller 32C can output information about the manipulation of the dump track lever 33C of the dump track 20 (one or both of the operative position and the manipulated variable) to the on-vehicle processor 30. The operator manipulates the dump track lever 33C to send the hydraulic controller 32C about an instruction of at least one of housing and lowering the vessel 22. The on-vehicle processor 30 can derive (can determine) whether the manipulation of the dump track lever 33C by the operator is normal (or abnormal) by acquiring information about the manipulation of the dump track lever 33C through the hydraulic controller 32C. The on-vehicle processor 30 can derive the presence or absence of an abnormal manipulation by the operator based on information about the manipulation of the dump track lever 33C. In the case where it is determined that an abnormal manipulation by the operator is found, the on-vehicle processor 30 can derive (can identify) the content of the abnormal manipulation. In the example, the on-vehicle processor 30 can identify that an abnormality occurs in the manipulation of the dump track lever 33C based on information about the manipulation of the dump track lever 33C.

The on-vehicle processor 30 can derive (can determine) whether the manipulation of a brake pedal 33D by the operator is normal (or abnormal) by acquiring information about the manipulation of the brake pedal 33D (one or both of the operative position and the manipulated variable). The on-vehicle processor 30 can determine the presence or absence of an abnormal manipulation by the operator based on information about the manipulation of the brake pedal 33D. In the case where it is determined that an abnormal manipulation by the operator is found, the on-vehicle processor 30 can derive (can identify) the content of the abnormal manipulation. In the example, the on-vehicle processor 30 can identify that an abnormality occurs in the manipulation of the brake pedal 33D based on information about the manipulation of the brake pedal 33D.

The tilt sensor 39 detects the inclination of the dump track 20 in the longitudinal direction. The result detected at the tilt sensor 39 is outputted to the on-vehicle processor 30. The on-vehicle processor 30 can derive information about the gradient (the slope) of the route on which the dump track 20 travels and information about irregularities of the route, for example, based on the output from the tilt sensor 39.

The on-vehicle processor 30 acquires a plurality of items of position information (time series data) about the dump track 20 detected at the position information detector 29 at every predetermined time in association with a lapse of the time. The plurality of acquired items of position information (time series data) is stored on the on-vehicle storage device 31 in association with time information.

Moreover, the on-vehicle processor 30 acquires a plurality of items of operation information (time series data) about the dump track 20 detected at the operation information detector 40 at every predetermined time in association with a lapse of the time.

As described above, the on-vehicle processor 30 associates the operation information about the dump track 20 with the position information through time information, and the operation information associated with the position information is stored on the on-vehicle storage device 31.

The on-vehicle processor 30 sends the position information associated with the time information stored on the on-vehicle storage device 31 and the operation information associated with the position information to the management side processor 12 of the management apparatus 10 through the on-vehicle wireless communication device 28.

When the management side processor 12 receives the position information associated with the time information and the operation information associated with the position information from the on-vehicle processor 30 through the management side wireless communication device 18, the management side processor 12 stores these items of information on the management side storage device 13.

Figure 5:
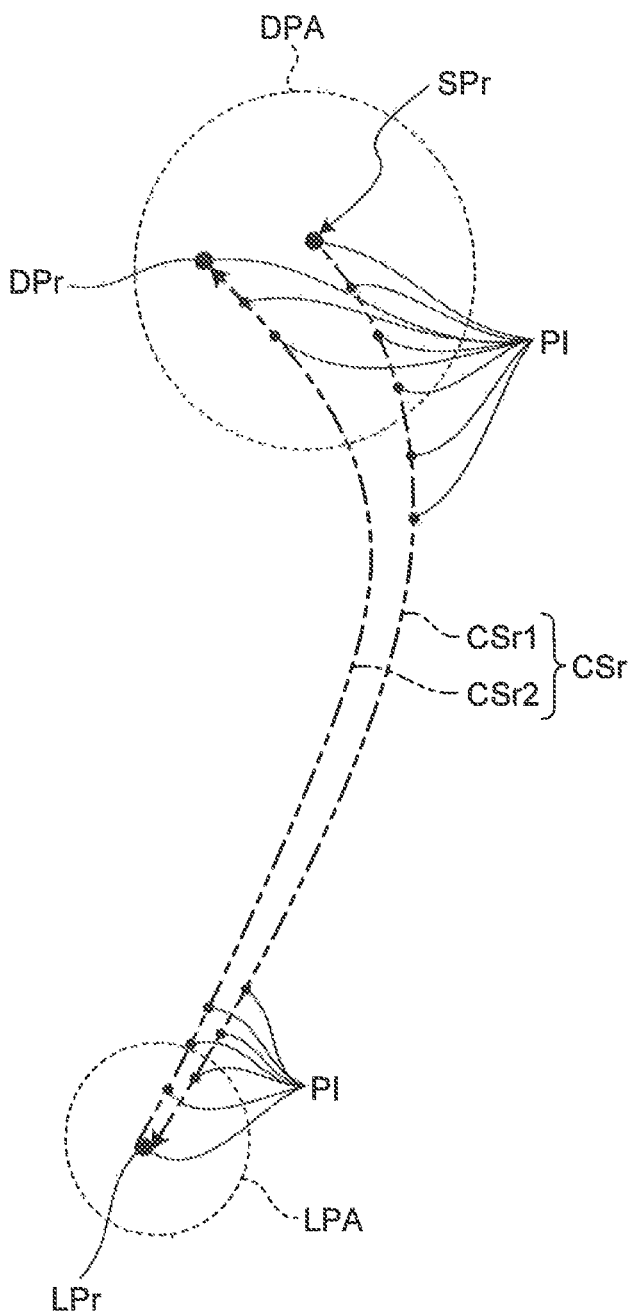
FIG. 5 is a diagram of an exemplary route on which a dump track has traveled.

FIG. 5 is a diagram of an exemplary route on which the dump track 20 has actually traveled. The dump track 20 unloads a load at the unloading site DPA illustrated in FIG. 5, and then travels toward the loading site LPA. The dump track 20 arrives at the loading site LPA, and a load is loaded on the vessel 22 by a loading mining machine such as a hydraulic excavator. The dump track 20 on which the load is loaded travels toward the unloading site DPA. The dump track 20 arrives at the unloading site DPA, and unloads the load at the unloading site DPA. In the embodiment, a cycle of the carrying operation of the dump track 20 is a series of work operations in which the dump track 20 starts from a predetermined place to the loading site LPA, loads a load at the loading site LPA, arrives at the unloading site DPA, and unloads the load. It is noted that the definition of a cycle of the carrying operation is not limited thereto. A cycle may be defined as work operations in which the starting point is a position at which the dump track 20 starts loading a load at a loading site, for example, finishes unloading operation, and then arrives at a loading site. A predetermined place where the dump track 20 starts toward the loading site LPA is referred to as a first position, the loading site LPA is referred to as a second position, and a position at which the load is unloaded in the unloading site DPA is referred to as a third position.

In the embodiment, the first position may be a predetermined position in the unloading site DPA or may be a predetermined position different from the unloading site DPA.

In a route on which the dump track 20 travels (in the following, appropriately referred to as an actual traveling route) CSr in a cycle of the carrying operation, a route on which the dump track 20 moves from a travel starting position SPr as the first position to a loading position LPr as the second position at which the dump track 20 loads a load in the loading site LPA is referred to as a going route CSr1. Moreover, in the actual traveling route CSr, a route on which the dump track 20 moves from the loading position LPr as the second position to an unloading position DPr as the third position at which the dump track 20 unloads the load in the unloading site DPA is referred to as a returning route CSr2. The going route CSr1 includes the travel starting position SPr as a starting point and the loading position LPr as an end point. The returning route CSr2 includes the loading position LPr as a starting point and the unloading position DPr as an end point.

The position information detector 29 mounted on the dump track 20 finds position information PI about the dump track 20 that the dump track 20 starts from the travel starting position SPr, arrives at the loading position LPr, and then goes to the unloading position DPr. For example, the position information detector 29 acquires present position information about the dump track 20 for every predetermined time period (a second, for example), and stores the information on the on-vehicle storage device 31. A group of a plurality of items of position information PI acquired at the position information detector 29 (in the following, appropriately referred to as a position information group) is included in the actual traveling route CSr of the dump track 20. Thus, the actual traveling route CSr can be expressed by a plurality of items of position information PI.

In the embodiment, the actual traveling route CSr is sometimes a registered route that is already stored (registered) on the management side storage device 13 because another dump track 20 has traveled or the dump track 20 has traveled by itself or the route is preset, or the actual traveling route CSr is sometimes a route on which the dump track 20 travels for a first time. The management side processor 12 illustrated in FIG. 2 identifies the actual traveling route CSr in which the management side processor 12 performs a predetermined route identification process to determine whether the actual traveling route CSr is matched with a registered route, whether a part of the actual traveling route CSr is a part of a registered route, or whether the actual traveling route CSr is a totally new route, for example. It is noted that the route identification process is performed at the management side processor 12 included in the management apparatus 10 illustrated in FIG. 2. However, the process may be performed at the on-vehicle processor 30 illustrated in FIG. 4.

Figure 6:
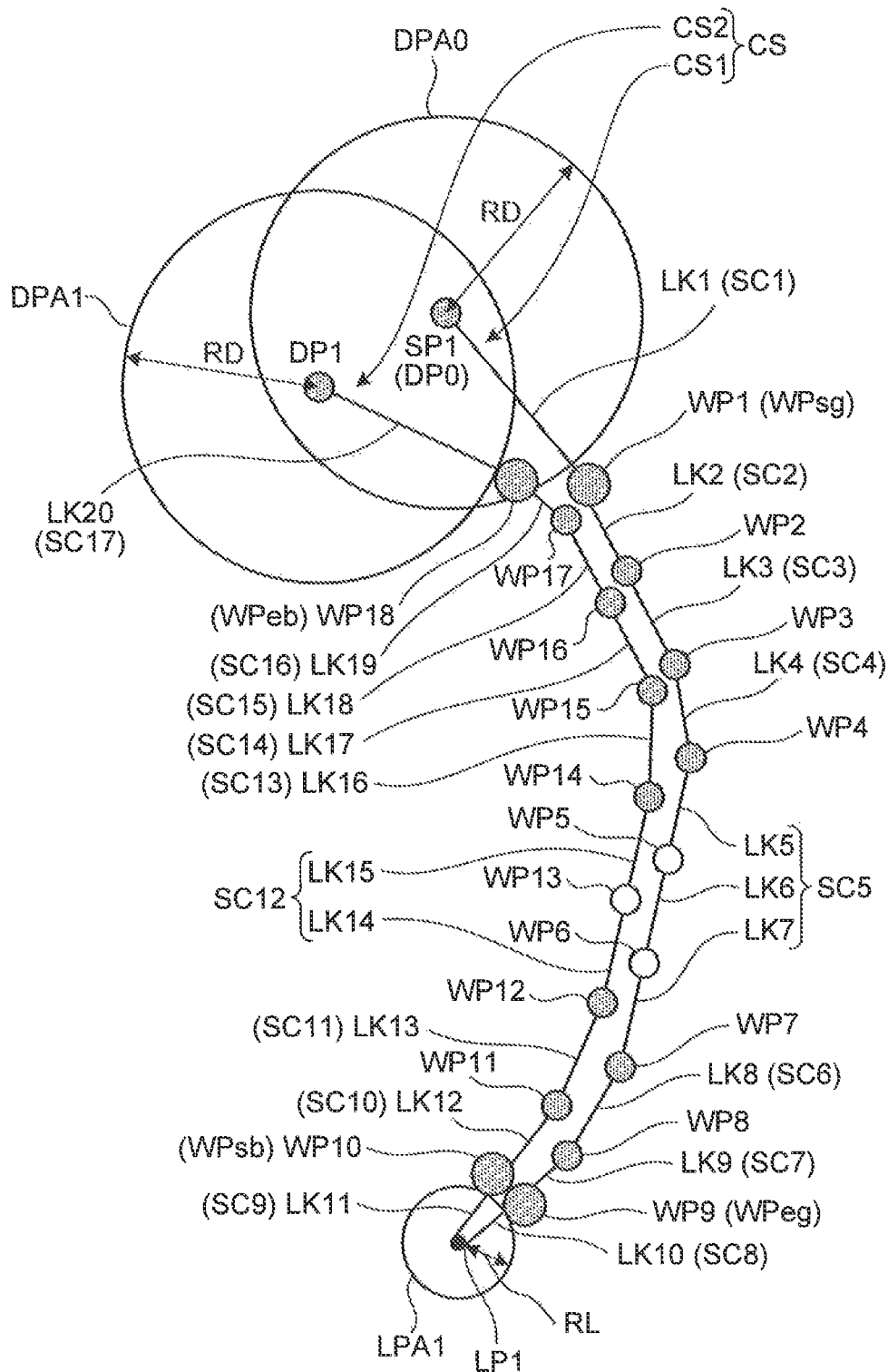
FIG. 6 is a diagram of exemplary items of information about a registered route according to the embodiment.

The registered route CS will be described, which is a comparative object for determining whether to match the actual traveling route when performing the route identification process. FIG. 6 is a diagram of an exemplary registered route CS. The registered route CS includes a going route CS1 and a returning route CS2. The starting point of the going route CS1 is a travel starting position SP1, and the end point is a loading position LP1. The starting point of the returning route CS2 is the loading position LP1, the end point is an unloading position DP1. The registered route CS includes a plurality of nodes, including the travel starting position SP1, the loading position LP1, the unloading position DP1 and a plurality of passage positions WP1 (WPsg), WP2, . . . WP9 (WPeg), WP10 (WPsb), WP11, . . . WP18 (WPeb), and links LK1, LK2, . . . LK20 that connect the nodes. On the registered route CS, the travel starting position SP1 corresponds to the first position, the loading position LP1 corresponds to the second position, and the unloading position DP1 corresponds to the third position.

The individual nodes, that is, the travel starting position SP1, the loading position LP1, the unloading position DP1 and a plurality of the passage positions WP1 (WPsg), WP2, . . . WP9 (WPeg) and the like correspond to items of position information PI included in the actual traveling route CSr. The node is a place expressed by the coordinates of a predetermined latitude, longitude, and altitude on the registered route CS. The links LK1, LK2, . . . LK20 connect nodes adjacent to each other. The going route CS1 of the registered route CS illustrated in FIG. 6 includes the travel starting position SP1, the loading position LP1, and a plurality of the passage positions WP1, WP2, . . . WP9 and the links LK1, LK2, . . . LK10 between the positions.

The returning route CS2 includes the loading position LP1, the unloading position DP1, and a plurality of the passage positions WP10, WP11, . . . WP18, and the links LK11, LK12, . . . LK20 between the positions. The registered route CS is a route on which the dump track 20 has actually traveled when the dump track 20 performs one cycle of the carrying operation. In this case, the travel starting position SP1 is an unloading position DP0 at which the dump track 20 has actually unloaded a load in an unloading site (in the following, appropriately referred to as a first unloading site) DPA0 before going to the loading position LP1. The unloading site DPA0 is a range (a first predetermined range) SPC1 of a predetermined radius RD where the travel starting position SP1 is the center. Similarly, an unloading site (in the following, appropriately referred to as a second unloading site) DPA1 is a range (a second predetermined range) of the predetermined radius RD where the unloading position DP1 is the center at which the dump track 20 loaded with a load at the loading position LP1 has unloaded the load. Moreover, a loading site LPA1 is a range of a predetermined radius RL where the loading position LP1 is the center. The travel starting position SP1 (the unloading position DP0) is a representative position that represents the unloading site DPA0, and the unloading position DP1 is a representative position that represents the unloading site DPA1.

The nodes, that is, the passage positions WP1, W2 , . . . WP18 exist on the registered route CS at every predetermined distance. The predetermined distance is provided at every 100 m, for example, which is not limited thereto in the embodiment. The passage position WP1 (WPsg) on the going route CS1 the closest to the unloading site DPA0 is provided on the outer side of the unloading site DPA0. The passage position WP18 (WPeb) on the returning route CS2 the closest to the unloading site DPA1 is provided on the outer side of the unloading site DPA1. The passage position WP9 (WPeg) on the going route CS1 the closest to the loading site LPA1 is provided on the outer side of the loading site LPA1. The passage position WP10 (WPsb) on the returning route CS2 the closest to the loading site LPA1 is provided on the outer side of the loading site LPA1. Namely, the passage positions WP1, WP2, . . . WP18 included in the registered route CS are provided on the outer side of the unloading sites DPA0 and DPA1 and the loading site LPA1.

In the example illustrated in FIG. 6, the registered route CS includes a plurality of specific sections SC1, SC2, . . . SC17. The specific sections SC1, SC2, . . . SC17 are portions where the characteristics, the orientation and the gradient, for example, are recognized as almost the same in the registered route CS. A specific section including a plurality of the links is a portion in the registered route CS in which the difference in the gradient between the adjacent links is within a predetermined value, the difference in the orientation between the adjacent links is within a predetermined value, and a node to be an intersection is not included between the links. For example, three adjacent links LK5, LK6, and LK7 included in the specific section SC5 have the gradients within a range considered to be almost the same, that is, the difference in the gradient between the adjacent links is within a predetermined value, the difference in the orientation is within a predetermined value, and no intersection is included between the links. In FIG. 6, the intermediate nodes, that is, the passage positions WP5 and WP6 on the specific section SC5 are expressed by white circles, and these nodes are not intersections. The specific section SC12 is also similar to the specific section SC5. Moreover, when the difference in the gradient and the difference in the orientation between the adjacent links do not satisfy the conditions, only one link is considered to be the specific section. For example, although the specific section SC2 corresponds to the link LK2, the specific section SC2 is a specific section including one link. As described later, in the embodiment, the number of times of traveling, the traveling time, and operation information, for example, are totalized for individual specific sections. In the case where the operation state of a plurality of the dump track 20 is evaluated, the specific sections SC1, SC2, . . . SC17 are used to compare the state of the road surface on which the dump tracks 20 travel under the same conditions. It is noted that a plurality of different registered routes CS may include and share the same specific section.

The loading position LP1 and the unloading positions DP0 and DP1 are described in the LP/DP database 14RD stored on the management side storage device 13. The LP/DP database 14RD also includes the description of a range of the predetermined radius RD where the unloading positions DP0 and DP1 are the center, that is, a range of the predetermined radius RL where the unloading sites DPA0 and DPA1 and the loading position LP1 are the center, that is, information about the loading site LPA1, in addition to the loading position LP1 and the unloading positions DP0 and DP1. The passage positions WP1, WP2, . . . WP18 are described on the individual route WP database 14WP stored on the management side storage device 13. The specific sections SC1, SC2, . . . SC17 are described on the stored individual route specific section database 14SC stored on the management side storage device 13. In identifying the actual traveling route CSr of the dump track 20, the route deter-mining unit 12a makes reference to information such as the LP/DP database 14RD, the individual route WP database 14WP, and the individual route specific section database 14SC to compare position information PI included in the actual traveling route CSr with position information about the nodes on the registered route stored on the registered route database 14CS.

Next, in the management method of a mining machine according to the embodiment, an exemplary process will be described in which the accumulated data of various items of operation information produced on the identified actual traveling route CSr is displayed in a form in which the data is easily seen and easily understood along the actual traveling route CSr. In the embodiment, the management side processor 12 of the management apparatus 10 is to perform an accumulated data acquiring process. It is noted that the on-vehicle processor 30 of the dump track 20 may perform the accumulated data acquiring process, or both of the management side processor 12 and the on-vehicle processor 30 may perform the accumulated data acquiring process. Moreover, in the embodiment, the management side storage device 13 of the management apparatus 10 is to store various items of data of the accumulated data acquiring process. It is noted that the on-vehicle storage device 31 of the dump track 20 or both of the management side storage device 13 and the on-vehicle storage device 31 may store various items of data of the accumulated data acquiring process.

Figure 7:
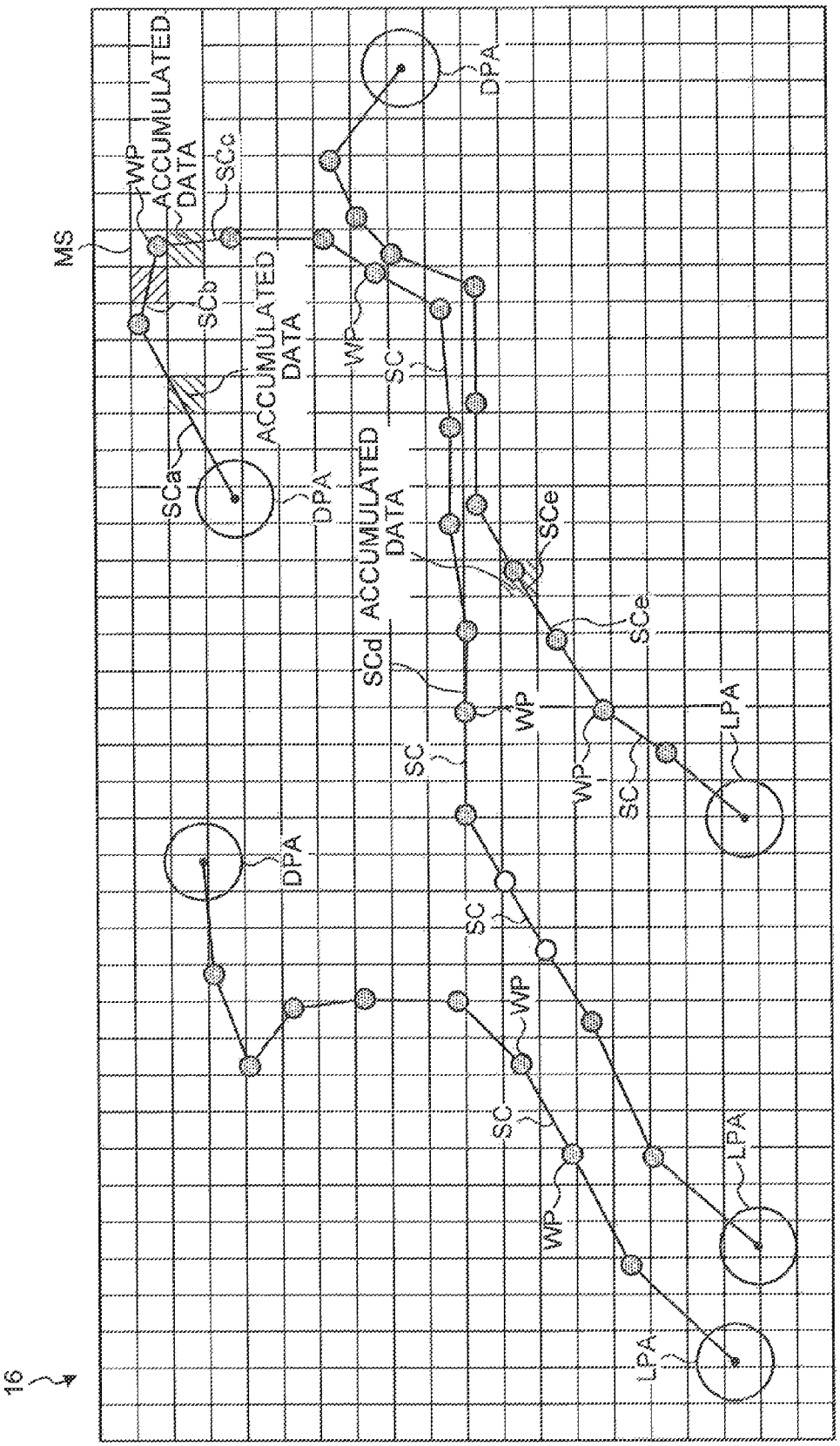
FIG. 7 is a diagram of an exemplary display screen according to the embodiment.

FIG. 7 is an exemplary screen of the display device 16 according to the embodiment. In FIG. 7, the screen of the display device 16 expresses a predetermined region of an operation site of the dump track 20 when seen perpendicularly from above, displaying the route of an evaluation target included in the predetermined region when seen perpendicularly from above. In FIG. 7, the displayed route is a route from a predetermined travel starting position (generally, the unloading site DPA) to the loading site LPA and a route of one cycle of actual work operations from the loading site LPA to the unloading site DPA. It is noted that only a part of one cycle of routes may be displayed. A plurality of linear lines is displayed across the display range of the display device 16. In other words, the linear lines are displayed at predetermined spacings on two axes orthogonal to each other in the horizontal direction, that is, a frame MS in a grid along a horizontal plane is displayed (in the following, referred to as a mesh). On the display device 16, a plurality of routes or a route of an evaluation target may be displayed and a route of an evaluation target to be displayed may be specified using the input device 17, for example. It is noted that the mesh MS may be displayed only in a range where the route of an evaluation target is displayed.

Four sides on the outer edge of the meshes are expressed by an expression describing linear lines in a plane, and positions on the horizontal plane in a range in the inner side of the meshes (that is, expressed by a predetermined range in the latitude and the longitude) can be found by arithmetic operations based on the linear expressions of these four sides. Thus, the position range of the section of the displayed route included in the inner side of the meshes is found. The accumulated data of operation information about the route in the section of the route included in the inner side of the meshes is displayed on the inner side of the meshes on the display device 16.

Subsequently, procedures will be described to find the accumulated data of operation information about the route in the section of the route included in the inner side of the mesh. As described above, operation information about the actual traveling route is stored on the management side storage device 13 in association with position information. As a result of identifying the actual traveling route, in the case where the actual traveling route is matched with a registered route registered on the registered route database, the actual traveling route is considered to be equal to the matched registered route, and operation information associated with position information included in the actual traveling route is combined with operation information associated with position information included in the matched registered route. Thus, operation information associated with position information about all the actual traveling routes matched so far is combined for the individual registered routes, and the operation information combined for the individual registered routes is stored on the operation information database.

In the case where a part of the specific section of the actual traveling route is matched with the specific section of a part of a registered route, the actual traveling route itself is newly registered on the registered route database. Moreover, operation information associated with position information included in the actual traveling route is stored as operation information associated with position information about the registered route, which is newly registered, on the operation information database, and operation information associated with position information in a part of the specific section of the matched actual traveling route is combined with operation information associated with position information in the specific section of a part of the matched registered route. Thus, operation information associated with position information in the specific section of all the actual traveling routes matched so far is combined for the individual specific sections, and the operation information combined for the individual specific sections is stored on the operation information database.

In the case where the actual traveling route is not matched with the registered route at all, the actual traveling route itself is newly registered on the registered route database, and operation information associated with position information included in the actual traveling route is stored as operation information associated with position information about the registered route, which is newly registered, on the operation information database.

The position range in the inner side of the meshes on the display device 16 is found by arithmetic operations, and the position range of the section of the route included in the meshes is found by arithmetic operations. Operation information associated with position information included in the position range of the found section is accumulated based on operation information stored on the operation information database for the route displayed on the display device 16, so that the accumulated data of operation information about the section can be found. At this time, in the case where the section is a part or all the specific section of the registered route, the accumulated data of operation information about the section includes the accumulation of operation information about all the dump tracks 20 that have traveled on the specific section. Moreover, in the case where the section includes portions other than the specific section of the registered route, the accumulated data of operation information about the section includes the accumulation of operation information about all the dump tracks 20 that have traveled on the registered route including the section.

As described above, the operation information about the dump track 20 includes various items of operation information such as information about the vehicle of the dump track 20 and information about the operation status. The operation information detector 40 can detect a plurality of items of operation information. In the following description, for an example, an example will be described in which the operation information detector 40 detects information about abnormal drives (abnormal manipulations), information about vehicle errors, and information about specific drive manipulations.

The management side processor 12 finds the accumulated data of information about a plurality of abnormal drives (abnormal manipulations), the accumulated data of information about a plurality of vehicle errors, and the accumulated data of information about a plurality of specific drive manipulations in a predetermined section of the route included in the inner side of the meshes MS. In the following description, the accumulated data of information about a plurality of abnormal drives (abnormal manipulations) is appropriately referred to as first accumulated data, the accumulated data of information about a plurality of vehicle errors is appropriately referred to as second accumulated data, and the accumulated data of information about a plurality of specific drive manipulations is appropriately referred to as third accumulated data.

<The Evaluation of the Operation State Based on the Accumulated Data>

In the embodiment, the management side processor 12 evaluates the operation state of the dump track 20 in a predetermined section of the route included in the inner side of the meshes MS based on at least one of the first accumulated data, the second accumulated data, and the third accumulated data.

In the embodiment, the management side processor 12 can evaluate (determine) whether an abnormal drive (an abnormal manipulation) occurs in a predetermined section of the route included in the inner side of the meshes MS and can evaluate (determine) the number of the occurrence of abnormal drives (abnormal manipulations) in the predetermined section based on the first accumulated data. In the case where the numeric value of the first accumulated data is great, the management side processor 12 determines that the number of the occurrence of abnormal drives (abnormal manipulations) in the predetermined section is great, whereas in the case where the numeric value of the first accumulated data is small, the management side processor 12 determines that the number of the occurrence of abnormal drives (abnormal manipulations) is small in the predetermined section.

Similarly, the management side processor 12 can evaluate (determine) whether a vehicle error occurs in the predetermined section and can evaluate (determine) the number of occurrence of vehicle errors in the predetermined section based on the second accumulated data. The management side processor 12 determines the size of the number of occurrence of vehicle errors in the predetermined section based on the size of the numeric value of the second accumulated data.

Similarly, the management side processor 12 can evaluate (determine) whether a specific drive manipulation is performed in the predetermined section and can evaluate (determine) the number of occurrence of specific drive manipulations in the predetermined section based on the third accumulated data. The management side processor 12 determines the size of the number of occurrence of specific drive manipulations in the predetermined section based on the size of the numeric value of the third accumulated data.

As described above, the management side processor 12 can evaluate (determine) the number of occurrence of the content of operation information in the predetermined section based on the accumulated data of a plurality of items of operation information in a predetermined section of the route included in the inner side of the meshes MS.

The abnormal drive (the abnormal manipulation) includes at least one of a drive (a manipulation) forbidden to the operator and a dangerous drive (a manipulation), for example. For example, the abnormal drive (the abnormal manipulation) includes a state in which the dump track 20 travels at a traveling speed faster than the prescribed traveling speed, a state in which the dump track 20 descends on a descent at a traveling speed faster than the prescribed speed, and a state in which the dump track 20 travels at an acceleration faster than the prescribed acceleration. Moreover, for example, the abnormal drive (the abnormal manipulation) includes a state in which the dump track 20 travels at a speed lower than the prescribed minimum traveling speed and a state in which the dump track 20 stops (halts) although the dump track 20 is supposed to travel. It can be can determined whether these abnormal drives occur based on the output value of the rotation sensor 25, for example. Furthermore, for example, the abnormal drive (the abnormal manipulation) includes a state in which the accelerator pedal 33A and the brake pedal 33D are simultaneously manipulated, or a state in which the dump track lever 33C is manipulated at a place different from the loading site LPA and the unloading site DPA.

For example, the vehicle error is a state in which the on-vehicle controller such as the engine controller 32A, the travel controller 32B, and the hydraulic controller 32C detects an abnormality by self-diagnosis for failure and a state in which a part of devices of the dump track 20 fails. For example, the vehicle error includes a state in which the wheel 23 is not sufficiently rotated although the accelerator pedal 33A is manipulated and a state in which the vessel 22 is not hoisted and lowered although the dump track lever 33C is manipulated. Whether the accelerator pedal 33A is manipulated can be determined based on the signal of the amount of the accelerator pedal 33A pressed, for example, and whether the wheel 23 is sufficiently rotated can be determined based on the output signal of the rotation sensor 25, for example. Whether the dump track lever 33C is manipulated can be determined based on the signal of the manipulated variable of the dump track lever 33C, for example. Whether the vessel 22 is hoisted and lowered can determined based on the amount of the hoist cylinder 36 extended, for example.

The specific drive manipulation includes a normal drive manipulation. For example, the specific drive manipulation may be the manipulation of the accelerator pedal 33A, the manipulation of the shift lever 33B, the manipulation of the dump track lever 33C, and the manipulation of the brake pedal 33D.

For example, in the case where it is determined based on the first accumulated data that the occurrence frequency is high in the state in which the dump track 20 travels at a traveling speed faster than the prescribed traveling speed in the predetermined section, the management side processor 12 may print from the printing device 19 a drive evaluation report to guide the operator of the dump track 20 to drive the dump track 20 at a decreased traveling speed in the predetermined section.

For example, in the case where it is determined based on the second accumulated data that the occurrence frequency is high in the state in which the wheel 23 is not sufficiently rotated although the accelerator pedal 33A is manipulated in the predetermined section, the management side processor 12 can evaluate (determine) that the road of the predetermined section is slippery, for example, and the management side processor 12 may print from the printing device 19 a drive evaluation report to guide the operator of the dump track 20 to drive so as to reduce the occurrence of slips of the wheel 23 in the predetermined section.

For example, in the case where it is determined that the frequency of manipulating the brake pedal 33D is high in the predetermined section based on the third accumulated data, the management side processor 12 can evaluate (determine) that the situation to reduce the traveling speed of the dump track 20 occurs in the predetermined section, for example. In the case where it is determined that the fact that the frequency of manipulating the brake pedal 33D is high in the predetermined section results from a poor road surface, for example, or results from a jam to possibly affect the productivity in the mine, the management side processor 12 may send an evaluation report to the manager to investigate the actual conditions of the road surface and a jam in the predetermined section.

<The Accumulated Data on Individual Vehicles>

Moreover, the management side processor 12 can find the accumulated data of a certain dump track 20 for the individual predetermined sections of the route included in the inner side of the meshes MS (at least one of the first accumulated data, the second accumulated data, and the third accumulated data) in a plurality of the dump tracks 20 operating in the mine. Moreover, the management side processor 12 can find the accumulated data of a plurality of the individual dump tracks 20 operating in the mine for the individual predetermined sections of the route included in the inner side of the meshes MS (at least one of the first accumulated data, the second accumulated data, and the third accumulated data). In other words, the management side processor 12 can find the accumulated data of the individual dump tracks 20 for the individual predetermined sections of the route included in the inner side of the meshes MS (at least one of the first accumulated data, the second accumulated data, and the third accumulated data).

For example, in the case where it is determined based on the first accumulated data that the frequency is high in which a certain dump track 20 in a plurality of the dump tracks 20 travels at a traveling speed faster than the prescribed traveling speed in a predetermined section of the route included in the inner side of a certain mesh MS, the management side processor 12 may print from the printing device 19 a drive evaluation report to guide the operator of the certain dump track 20 to drive the certain dump track 20 at a moderate traveling speed in the predetermined section.

For example, in the case where it is determined based on the second accumulated data that the frequency is high in which a certain dump track 20 in a plurality of the dump tracks 20 slips in a predetermined section of the route included in the inner side of a certain mesh MS, the management side processor 12 may print from the printing device 19 a drive evaluation report to guide the operator of the certain dump track 20 to drive so as to reduce the occurrence of slips in the predetermined section.

For example, in the case where it is determined based on the third accumulated data that the frequency of manipulating the accelerator pedal 33A of a certain dump track 20 is high in a plurality of the dump tracks 20 in a predetermined section of the route included in the inner side of a certain mesh MS, the management side processor 12 may print from the printing device 19 a drive evaluation report to guide the operator of the certain dump track 20 to drive so as to reduce the manipulation of the accelerator pedal 33A in the predetermined section, such as reducing the amount of fuel consumed by the certain dump track 20, for example.

As described above, the evaluation of the accumulated data of a plurality of items of operation information in a predetermined section of the route included in the inner side of the meshes MS is described.

<The Display of Accumulated Data>

Next, an example will be described in which the accumulated data (the first accumulated data, the second accumulated data, and the third accumulated data) is displayed on the display device 16.

In the embodiment, the management side processor 12 finds the position range of a predetermined section of the route included in the inner side of the meshes MS for the individual routes displayed on the screen of the display device 16, and displays an image expressing types of accumulated data produced in the predetermined section corresponding to the found position range and the accumulation degree of a mesh corresponding to the predetermined section. The types of accumulated data (the first accumulated data, the second accumulated data, and the third accumulated data) displayed in the mesh may be specified using the input device 17.

In the example illustrated in FIG. 7, the management side processor 12 displays the accumulated data on the display device 16 in such a way that the color of the mesh grid expressing the accumulated data is varied between the first accumulated data of information about abnormal drives (the abnormal manipulation), the second accumulated data of information about vehicle errors, and the third accumulated data of information about specific drive manipulations. In FIG. 7, the color of the mesh grid is expressed by hatching.

For example, the color of the mesh grid expressing the first accumulated data may be blue, the color of the mesh grid expressing the second accumulated data may be red, and the color of the mesh grid expressing the third accumulated data may be green.

Moreover, the management side processor 12 may display the accumulated data on the display device 16 in such a way that the depth of the color of the mesh grid is varied according to the types of the accumulated data (the first accumulated data, the second accumulated data, and the third accumulated data).

For example, it may be possible that the color of the mesh grid expressing the first accumulated data is the deepest, the color of the mesh grid expressing the second accumulated data is the second deepest to the first accumulated data, and the color of the mesh grid expressing the third accumulated data is the lightest.

Furthermore, the management side processor 12 may display the accumulated data on the display device 16 in such a way that the depth of the color of the mesh grid is varied based on the accumulation degree (the accumulation level) of the accumulated data. For example, the mesh may be displayed in such a way that the color of the mesh grid is deeper as the accumulation degree of the accumulated data is high, whereas the color of the mesh grid is lighter as the accumulation degree of the accumulated data is low. In the example illustrated in FIG. 7, the shades of the mesh grid are expressed by the sizes of gaps between lines in hatching. It is noted that in the case where the accumulation degree of the accumulated data is zero, it may be possible that the mesh is a transparent mesh, in other words, the mesh is not displayed.

It is noted that an image (an icon, for example) expressing the accumulated data may be differently displayed in the mesh according to the types of accumulated data. Namely, the management side processor 12 may display the accumulated data on the display device 16 in such a way that designs are varied between the image expressing the first accumulated data, the image expressing the second accumulated data, and the image expressing the third accumulated data.

Moreover, the management side processor 12 may display the accumulated data in the mesh in such a way that figures expressing the accumulated data are varied according to the types of the accumulated data (the first accumulated data, the second accumulated data, and the third accumulated data).

Figure 8:
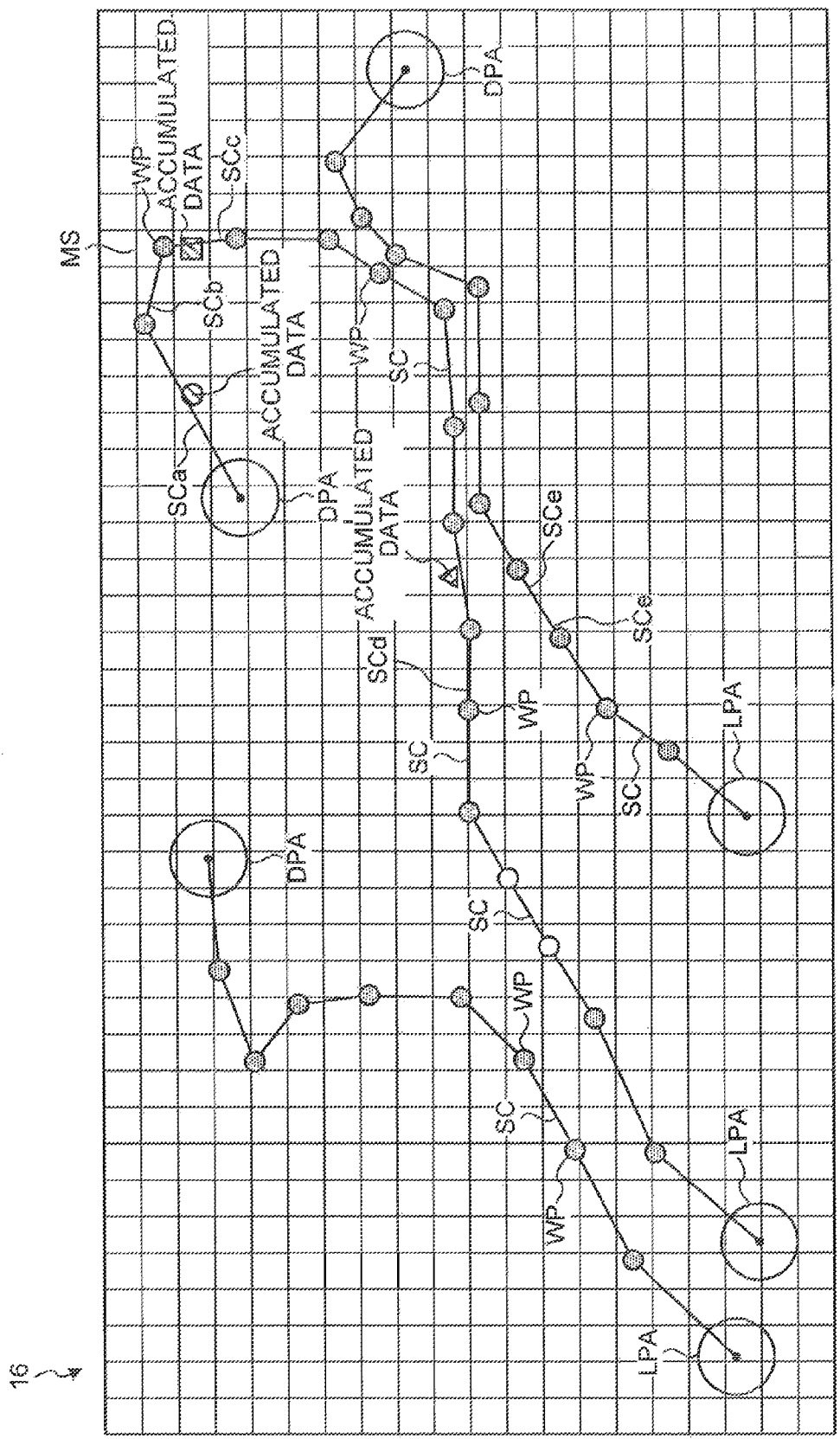
FIG. 8 is a diagram of an exemplary display screen according to the embodiment.

For example, in the example illustrated in FIG. 8, the figure expressing the first accumulated data is a quadrilateral, the figure expressing the second accumulated data is a circle, and the figure expressing the third accumulated data is a triangle.

Furthermore, the management side processor 12 may display the accumulated data on the display device 16 in such a way that the color of the image expressing the accumulated data displayed in the mesh is varied according to the types of the accumulated data (the first accumulated data, the second accumulated data, and the third accumulated data).

For example, it is possible that the image expressing the first accumulated data is blue, the image expressing the second accumulated data is red, and the image expressing the third accumulated data is green.

In addition, the management side processor 12 may display the accumulated data on the display device 16 in such a way that the depth of the color of the image expressing the accumulated data displayed in the mesh is varied according to the types of the accumulated data (the first accumulated data, the second accumulated data, and the third accumulated data).

For example, it is possible that the color of the image expressing the first accumulated data is the deepest, the color of the image expressing the second accumulated data is the second deepest to the first accumulated data, and the color of the image expressing the third accumulated data is the lightest.

Moreover, the management side processor 12 may display the accumulated data on the display device 16 in such a way that the outer dimensions (the outer size) of the image expressing the accumulated data displayed in the mesh are varied according to the types of the accumulated data (the first accumulated data, the second accumulated data, and the third accumulated data).

For example, it is possible that the outer dimensions (the outer size) of the figure expressing the first accumulated data are the largest, the outer dimensions (the outer size) of the figure expressing the second accumulated data are the second largest to the first accumulated data, and the outer dimensions (the outer size) of the figure expressing the third accumulated data are the smallest.

Furthermore, the management side processor 12 may display the accumulated data on the display device 16 in such a way that the design of image is varied based on the accumulation degree of the accumulated data. It is noted that when the accumulation degree of the accumulated data is zero, it may be possible that the mesh and the image or the figure expressing the accumulated data are not displayed.

In addition, the management side processor 12 may display the accumulated data in the mesh on the display device 16 in such a way that the figure of the image is changed based on the accumulation degree of the accumulated data. For example, the management side processor 12 may display the image on the display device 16 in such a way that in the case where the accumulation degree of the accumulated data ranges in a predetermined large number, the image is a quadrilateral, in the case where the accumulation degree of the accumulated data ranges in a predetermined moderate number, the image is a triangle, and in the case where the accumulation degree of the accumulated data ranges in a predetermined small number, the image is a circle.

Moreover, the management side processor 12 may display the accumulated data in the mesh on the display device 16 in such a way that the color of the image is changed based on the accumulation degree of the accumulated data. For example, the management side processor 12 may display the image on the display device 16 in such a way that in the case where the accumulation degree of the accumulated data ranges in a predetermined large number, the image is red, in the case where the accumulation degree of the accumulated data ranges in a predetermined moderate number, the image is yellow, and in the case where the accumulation degree of the accumulated data ranges in a predetermined small number, the image is green.

Furthermore, the management side processor 12 may display the accumulated data in the mesh on the display device 16 in such a way that the depth of the color of the image is changed based on the accumulation degree of the accumulated data. For example, the management side processor 12 may display the image on the display device 16 in such a way that the color of the image is deeper as the accumulation degree of the accumulated data is higher, whereas the color of the image is lighter as the accumulation degree of the accumulated data is smaller.

In addition, the management side processor 12 may display the accumulated data in the mesh on the display device 16 in such a way that the size of the image (the figure) is changed based on the accumulation degree of the accumulated data. For example, the management side processor 12 may display the image on the display device 16 in such a way that the outer dimensions (the outer size) of the image (the figure) are larger as the accumulation degree of the accumulated data is higher, whereas the outer dimensions (the outer size) of the image (the figure) are smaller as the accumulation degree of the accumulated data is lower.

Figure 9:
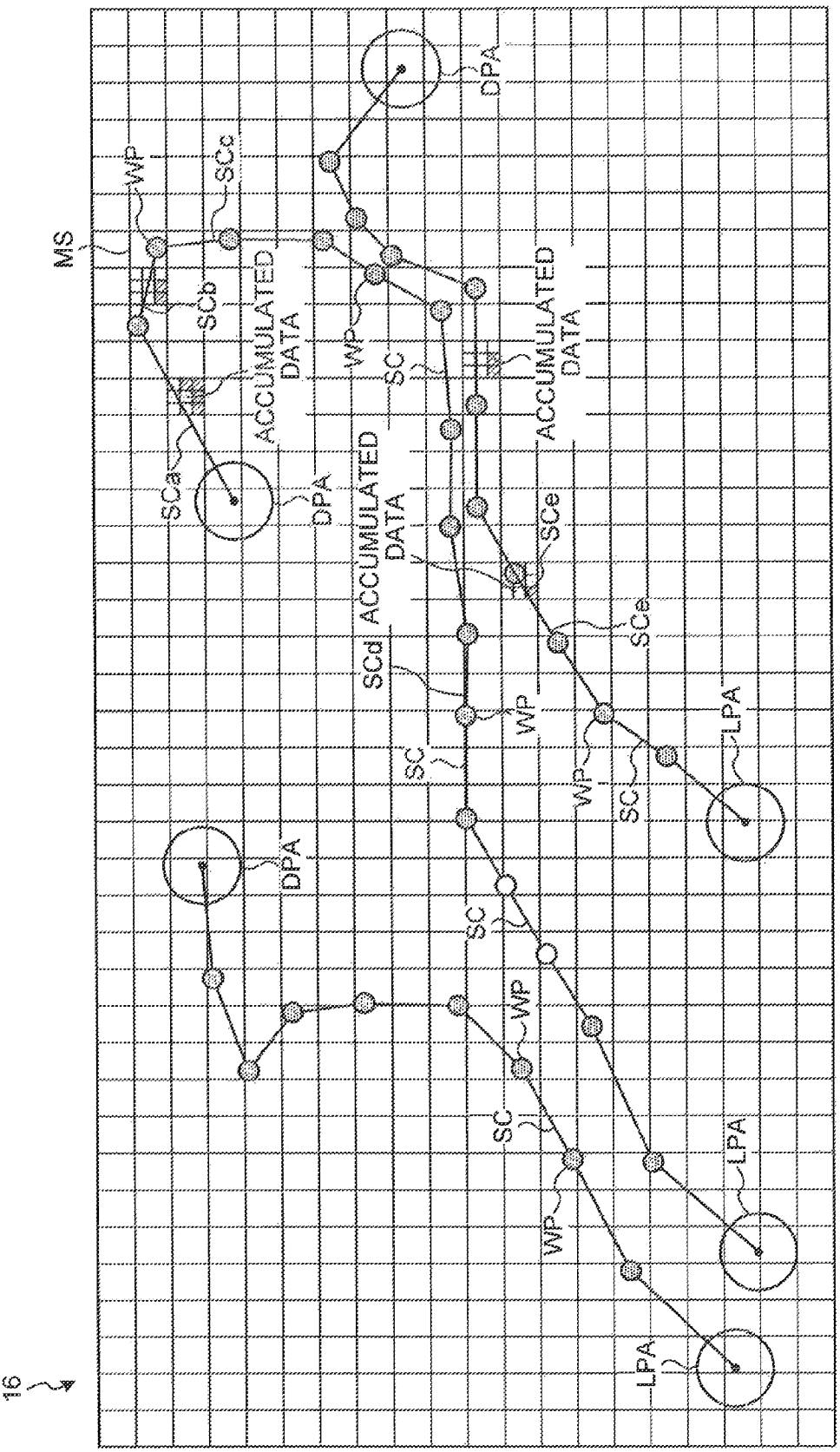
FIG. 9 is a diagram of an exemplary display screen according to the embodiment.

Moreover, as illustrated in FIG. 9, an image including a plurality of openings (grids) in a grid may be displayed in the meshes and the number of openings (grids) to be colored in the mesh may be changed according to the accumulation degree of the accumulated data. For example, the management side processor 12 may display the mesh on the display device 16 in such a way that the number of openings (grids) to be colored is increased as the accumulation degree of the accumulated data is higher.

It is noted that in the embodiment, in the case where the image design is changed based on the content of operation information (the abnormal drive, the vehicle error, and the specific drive manipulation), the management side processor 12 may display the accumulated data on the display device 16 in such a way that the image design expressing the accumulated data on individual items of operation information is changed in consideration of the importance degree of the content of operation information, for example.

FIG. 10 is another exemplary screen of the display device 16. In the example illustrated in FIG. 10, the display device 16 displays the list of detailed data of operation information occurring on all the routes on the display screen of the display device 16 illustrated in FIG. 7, displaying the types of operation information in association with the occurrence frequency of the event of operation information (for example, the operation information event occurrence number per cycle of all the dump tracks, the operation information event occurrence number per time of all the dump tracks, the operation information event occurrence number per operation period of the dump tracks, and so on). For example, the types of operation information may be information about abnormal drives, information about vehicle errors, and information about specific drive manipulations. In the example illustrated in FIG. 10, the display device 16 displays symbols associated with the types of operation information, the types of operation information, the numeric values of the occurrence frequency, and the histogram of the occurrence frequency.

Based on the display on the display device 16, it can be evaluated that (it can be determined that) what event (the abnormal drive (the abnormal manipulation), the vehicle error, and the specific drive manipulation) occurs in which section of the route and what degree the event occurrence number is. In the case where a section includes a large numeric value of the first accumulated data, it can be determined that the number of the occurrence of abnormal drives (abnormal manipulations) is great in the section, and the operator of the dump track 20 that has traveled on the section can be guided not to drive inappropriately.

Similarly, in the case where a section includes a large numeric value of the second accumulated data, it can be determined that the number of occurrence of vehicle errors is great in the section, and measures can be taken to investigate causes that vehicle errors are prone to occur in the section, for example.

Similarly, in the case where a section includes a large numeric value of the third accumulated data, it can be determined that the number of occurrence of specific drive manipulations is great in the section. When it is determined that the specific drive manipulation is an inappropriate drive from the viewpoints of productivity and fuel consumption, the operator of the dump track 20 that has traveled on the section can be guided so as not to drive inappropriately.

As described above, based on the display on the display device 16, it can be evaluated that (it can be determined that) what event of operation information occurs in which section of which traveling route and what degree event occurs. It is noted that the evaluation based on the display on the display device 16 may be performed by the manager, for example.

<The Accumulated Data on Individual Vehicles>

Moreover, the display device 16 can display the accumulated data (at least one of the first accumulated data, the second accumulated data, and the third accumulated data) in a predetermined section on a certain route on which a certain dump track 20 has traveled or a route on which a certain operator has driven the dump track 20 in a plurality of the dump tracks 20 operating in the mine. Moreover, the display device 16 can display the accumulated data in a predetermined section of the traveling route for a plurality of the individual dump tracks 20 operating in the mine. In other words, the management side processor 12 can display the accumulated data in a predetermined section of the traveling route for the individual operators or for the individual dump tracks 20.

FIG. 11 is an exemplary screen of the display device 16. The display device 16 displays the model name and the serial number of the dump track 20 in association with all the operation information event occurrence numbers occurring in the dump track 20. In the example illustrated in FIG. 11, the operation information event occurrence number is shown in detail for the individual dump tracks 20.

FIG. 12 is another exemplary screen of the display device 16. In the example illustrated in FIG. 12, the display device 16 displays the model name and the serial number of the dump track 20, the time at which the operation information event occurs, and the types of the operation information event that has occurred in association with each other. The types of operation information are detailed information about abnormal drives, vehicle errors, and specific drive manipulations. In the example illustrated in FIG. 12, the display device 16 displays detailed history information about operation information events that have occurred in the individual dump tracks 20, so that the operation information event occurrence history can be easily confirmed for the individual dump tracks 20.

As described above, the case is taken as an example where operation information is information about abnormal drives, information about vehicle errors, and information about specific drive manipulations. As described above, the operation information includes a plurality of items of operation information. For example, the display device 16 may display the accumulated data of information about a plurality of the amounts of fuel consumed (fuel consumption) of the dump track 20 in a predetermined section of the route in an image, or the display device 16 may display the accumulated data of information about a plurality of the traveling speeds of the dump track 20 in the specific section SC in an image. Also in the case where these items of accumulated data are displayed, the display device 16 may display images in different designs based on the accumulation degree of the accumulated data, or may display images in different designs based on the content of operation information.

It is noted that the content on the display illustrated in FIGS. 7 to 12 may be printed using the printing device 19. Namely, it is fine that the evaluation according to the present invention is performed based on figures and tables outputted from the display device 16 or the printing device 19.

As described above, according to the embodiment, the display device 16 displays the screen that a predetermined region of the mine site where a plurality of the dump tracks 20 operates is seen perpendicularly from above, displays one or more of the traveling routes of the dump track 20 in the predetermined region on the screen from the viewpoint seen perpendicularly from above, and displays a plurality of the linear lines in a grid (referred to as the mesh) at predetermined spacings across the screen. The accumulated data of a plurality of items of operation information (information about abnormal drives, information about vehicle errors, information about specific drive manipulations, and so on) that have occurred in the predetermined section of the traveling route included in the inner side of the meshes and the occurrence number are found, and the type and the occurrence number of the found accumulated data are displayed in the mesh. Thus, what operation information event (an inappropriate drive manipulation, the occurrence of a problematic vehicle error, a problematic specific drive manipulation, and so on) occurs in which section of the route, that is, at which position and what degree of the frequency the operation information event occurs can be quickly and appropriately grasped, so that it is possible to easily take specific measures against the operation information event and to investigate measures, for example. Moreover, according to the embodiment, it is possible to appropriately evaluate the operation state of the dump track 20 in a predetermined section of the traveling route based on the accumulated data of the operation state and the occurrence frequency.

Furthermore, according to the embodiment, the accumulated data of at least information about an abnormality of the dump track 20 is acquired as operation information about the dump track 20, so that it is possible to appropriately and quickly perform the abnormality diagnosis of the dump track 20. In addition, it is possible to take appropriate measures for improving the productivity of the dump track 20 and for improving the drive manipulation technique of the operator of the dump track 20, for example, based on an appropriate abnormality diagnosis.

Moreover, in the embodiment, the display device 16 displays the occurrence number of the accumulated data in an image including the mesh. Therefore, it is possible to quickly grasp the accumulation degree of the accumulated data.

Furthermore, in the embodiment, the display device 16 displays images in different designs based on the accumulation degree of the accumulated data (the accumulation extent). Therefore, it is possible to quickly grasp the accumulation degree of the accumulated data.

In addition, in the embodiment, the display device 16 displays images in different designs between the accumulated data of the first operation information (information about abnormal drives, for example) and the accumulated data of the second operation information (for example, the information about vehicle errors). Therefore, it is possible to quickly grasp the accumulated data individually for the content of operation information.

It is noted that in the foregoing embodiment, the management side processor 12 generates, displays, and evaluates the accumulated data. However, the on-vehicle processor 30 may generate, display, and evaluate the accumulated data. Moreover, the on-vehicle processor 30 may perform the route identification process.

It is noted that in the foregoing embodiment, a positioning satellite different from the GPS satellite may be used for detecting position information about the dump track 20. For example, the dump track 20 may be positioned using the GNSS (Global Navigation Satellite System) to detect position information about the dump track 20.

The configurations and elements of the foregoing embodiment include ones that a person skilled in the art can easily conceive, ones substantially the same, and so-called equivalents. Moreover, the configurations and elements of the foregoing embodiment can be appropriately combined. Furthermore, a part of the components is not sometimes used.

REFERENCE SIGNS LIST

1 MANAGEMENT SYSTEM
4 LOADER
10 MANAGEMENT APPARATUS
12 MANAGEMENT SIDE PROCESSOR
13 MANAGEMENT SIDE STORAGE DEVICE
18 MANAGEMENT SIDE WIRELESS COMMUNICATION DEVICE
20 DUMP TRACK
25 ROTATION SENSOR
26 PRESSURE SENSOR
28 ON-VEHICLE WIRELESS COMMUNICATION DEVICE
29 POSITION INFORMATION DETECTOR
30 ON-VEHICLE PROCESSOR
31 ON-VEHICLE STORAGE DEVICE
40 OPERATION INFORMATION DETECTOR
CS REGISTERED ROUTE
CSr ACTUAL TRAVELING ROUTE
LK LINK
PI POSITION INFORMATION
SC SPECIFIC SECTION
WP PASSAGE POSITION

The invention claimed is:

1. A mining machine management system comprising:
a position information detector which is mounted on a mining machine enabled to travel on a route in a mine and detects position information about the mining machine, the position information detector including a receiver that is connected to an antenna and receives an electrical signal, the antenna receiving radio waves from a positioning satellite and converting the radio waves into the electrical signal;
an operation information detector which is mounted on the mining machine and detects operation information about the mining machine;
a processor which divides a predetermined section of the route by meshes in grids along a horizontal plane and obtains accumulated data of a plurality of items of the operation information in respective sections of the route included in inner sides of the meshes based on the operation information in association with the position information; and
an output device which outputs the accumulated data together with the route in an image in association with the mesh,
wherein the accumulated data of the operation information includes accumulated data of at least one of information about an abnormal drive, information about a vehicle error, and information about a specific drive manipulation.

2. The mining machine management system according to claim 1, wherein the output device outputs a plurality of items of the accumulated data of the operation information which are different from each other in a same screen simultaneously.

3. The mining machine management system according to claim 1, wherein the outputted route is all of a route of one cycle of actual work operations of a mining machine.

4. The mining machine management system according to claim 3, wherein the image is outputted to an inside of a mesh in a grid.

5. The mining machine management system according to claim 3, wherein the output device outputs images in different designs based on an accumulation degree of the accumulated data.

6. The mining machine management system according to claim 3, wherein:
the operation information includes first operation information and second operation information; and
the output device outputs images in different designs between accumulated data of the first operation information and accumulated data of the second operation information.

7. The mining machine management system according to claim 5, wherein the design includes at least one of a color, shape, and size.

8. The mining machine management system according to claim 1, comprising an evaluation device which evaluates an operation state of the mining machine in the predetermined section based on the accumulated data.

9. A management method of a management system of a mining machine including a position information detector which is mounted on a mining machine enabled to travel on a route in a mine and detects position information about the mining machine; an operation information detector which is mounted on the mining machine and detects operation information about the mining machine; a processor having a computer; and an output device connected to the processor, the management method comprising:
detecting, by the position information detector, position information about the mining machine on the route, the position information detector including a receiver that is connected to an antenna and receives an electrical signal, the antenna receiving radio waves from a positioning satellite and converting the radio waves into the electrical signal;
detecting, by the operation information detector, operation information on the route of the mining machine; and
dividing a predetermined section of the route by meshes in grids along a horizontal plane and obtaining, by the processor, accumulated data of a plurality of items of the operation information in a respective sections of the route included in inner sides of the meshes based on the operation information in association with the position information,
wherein the accumulated data of the operation information includes accumulated data of at least one of information about an abnormal drive, information about a vehicle error, and information about a specific drive manipulation, and
wherein the accumulated data is outputted to the output device together with the route in an image in association with the mesh.

10. The management method of a mining machine according to claim 9, wherein a plurality of items of the accumulated data of the operation information which are different from each other is outputted in a same screen simultaneously by the output device.

11. The management method of a mining machine according to claim 9, wherein an operation state of the mining machine in the predetermined section is evaluated based on the accumulated data.

12. The mining machine management system according to claim 6, wherein the design includes at least one of a color, shape, and size.

* * * * *